United States Patent [19]

Imai

[11] Patent Number: 5,638,115
[45] Date of Patent: Jun. 10, 1997

[54] FILM IMAGE INPUT SYSTEM FOR REPRODUCING A FILM IMAGE ON A TV SCREEN

[75] Inventor: Ryo Imai, Tokyo, Japan

[73] Assignee: Fuji Photo Film Co., Ltd., Kanagawa, Japan

[21] Appl. No.: 329,134

[22] Filed: Oct. 25, 1994

Related U.S. Application Data

[62] Division of Ser. No. 755,472, Sep. 5, 1991, Pat. No. 5,389,966.

[30] Foreign Application Priority Data

| Sep. 14, 1990 | [JP] | Japan | 2-245113 |
| Jan. 18, 1991 | [JP] | Japan | 3-4638 |
| Jan. 18, 1991 | [JP] | Japan | 3-4639 |
| Mar. 8, 1991 | [JP] | Japan | 3-43780 |
| Mar. 11, 1991 | [JP] | Japan | 3-44918 |
| Mar. 11, 1991 | [JP] | Japan | 3-44919 |
| Mar. 11, 1991 | [JP] | Japan | 3-44920 |
| Aug. 22, 1991 | [JP] | Japan | 3-211171 |

[51] Int. Cl.⁶ ............................... H04N 5/253
[52] U.S. Cl. ............................ 348/98; 348/358
[58] Field of Search ............................ 348/239, 207, 348/96, 97, 98, 373, 374, 375, 358; 354/75; 352/166, 167, 34; 353/25, 26 R, 26 A; H04N 5/253

[56] References Cited

U.S. PATENT DOCUMENTS

| 4,245,253 | 1/1981 | Fearnside | 348/96 |
| 4,245,257 | 1/1981 | Fearnside | 358/214 |
| 4,322,128 | 3/1982 | Brake | 350/16 |
| 4,482,924 | 11/1984 | Brownstein | 348/302 |
| 4,485,406 | 11/1984 | Brownstein | 348/96 |
| 4,506,300 | 3/1985 | Fearnside | 348/110 |
| 4,652,929 | 3/1987 | Stemme et al. | 348/96 |
| 4,850,687 | 7/1989 | Reis et al. | 359/223 |
| 4,868,663 | 9/1989 | Grihaldi et al. | 348/96 |
| 4,920,419 | 4/1990 | Easterly | 348/96 |
| 4,989,077 | 1/1991 | Yamamoto | 348/96 |
| 5,067,020 | 11/1991 | Funston | 348/112 |
| 5,389,966 | 2/1995 | Ikaki et al. | 348/98 |

FOREIGN PATENT DOCUMENTS

| 54-133824 | 10/1979 | Japan | H04J 5/30 |
| WO90/04301 | 4/1990 | WIPO | H04N 1/387 |

*Primary Examiner*—John K. Peng
*Assistant Examiner*—Tuan V. Ho
*Attorney, Agent, or Firm*—Sughrue, Mion, Zinn, Macpeak & Seas

[57] ABSTRACT

A film image input system is disclosed which provides an increased degree of feedom of design thereof, can be reduce the size and costs thereof, and can execute a trimming operation with ease. The film image input system forms an image of a developed still photo film 134 on a light receiving surface of an image pickup element 140 through a zoomable taking lens 138 and outputs to a monitor TV an image signal photo-electrically converted by the image pickup element 140 to thereby reproduce the film image on the screen of the monitor TV. The film image input system comprises at least one mirror 137 interposed between the photo film 134 and taking lens 138 for bending the optical axis of the taking lens 138, a mirror drive mechanism 168 for inclining the mirror 137 in all directions, and an operation part 170 for driving the mirror drive mechanism 168 in order to execute a desired scanning. This allows the system to be made compact and increases the freedom of design of the system.

3 Claims, 37 Drawing Sheets

FILM IMAGE INPUT SYSTEM FOR REPRODUCING A FILM IMAGE ON A TV SCREEN

This is a divisional of application Ser. No. 07/755,472 field Sep. 5, 1991 U.S. Pat. No. 5,389,966.

BACKGROUND OF THE INVENTION

1. Field of the Invention

The present invention relates to a film image input system and, in particular, to a film image input system which forms an image of a developed still photo film on a light receiving surface of an image pickup element through a taking lens, converting the image into an image signal photo-electrically by the image pickup element, and outputting the image signal to a monitor TV, thereby reproducing the film image on the screen of the monitor TV.

2. Description of the Related Art

Conventionally, there is known a film image input system which picks up an image of a developed still photo film by an image pickup element such as a CCD or the like, converts the image into an image signal, and outputs the image signal to a monitor TV.

In other words, as shown in FIG. 42, the conventional film image input system 1 includes a lighting unit 4 to project an illuminating light to the developed still photo film 2, a taking lens 6 and the image pickup element (CCD) 8 which are all disposed on the same axis. In particular, the film 2 is disposed on the optical axis of the lighting unit 4 and taking lens 6, and the light projected from the lighting unit 4 illuminates the image recorded in the film 2. The light that has transmitted through the film is condensed by the taking lens 6 and is focused on the CCD 8, in which the image recorded on the film 2 is converted into the image signal and is then output. In this manner, the film image can be reproduced on the monitor TV connected to the film image input system 1.

Also, according to the prior art, there are known other types of film image input systems which respectively include a zoom mechanism used to vary an image magnification, a film scan mechanism (X-Y moving mechanism), an image sensor rotating mechanism and the like (U.S. Pat. No. 4,482,924, U.S. Pat. No. 4,485,406, U.S. Pat. No. 4,506,300 and so on).

Further, there has been proposed in U.S. Pat. No. 4,920,419 patent publication a film image input system which uses a single focus lens as a taking lens, moves the single focus lens to vary an image magnification, and also moves a CCD to thereby achieve a focusing action.

However, due to the fact that the conventional film image input system 1 is constructed in such a manner that the lighting unit 4, taking lens 6 and CCD 8 are arranged in a line, the whole system is large in size and long and narrow in shape which results in the limited freedom of design of the system. Also, if the system is constructed in such a manner that the single focus lens and CCD can be moved to thereby vary the image magnification, the whole system becomes further larger in size. Further, if the CCD is moved, it is difficult to provide wires within the system without performing signal processings such as amplification and the like, because a signal from the CCD is faint. For this reason, in this case, a signal process circuit must be moved together with the CCD.

Also, when only an image within a necessary range is taken out from one frame of a film and the image displayed (trimmed) on the entire screen of the monitor TV, it is necessary to select the image magnification properly and at the same time to move (scan) the film 2 or taking lens 6 in the longitudinal and transverse directions by use of an X-Y moving mechanism 9. Therefore, it is necessary to secure a space to move the film 2 and taking lens 6 with respect to each other within the range of one frame of the film image, which increases the size of the film image input system.

Further, when the trimming is executed in this type of film image input system, it is necessary to zoom the taking lens and to scan the film. However, when the trimming is executed once, because the portion of the film that is not displayed on the monitor TV is not known, zoomings and scannings must be performed very frequently in a fine adjustment time when the portion to be looked at is searched or the framing is executed, which results in the complicated operations. Also, to find out the frame to be looked at from a film having a large number of frames, the frame must be found by feeding the film frame by frame, which requires much time and takes pains.

SUMMARY OF THE INVENTION

The present invention aims at eliminating the drawbacks found in the above-mentioned conventional film image input system.

Accordingly, it is an object of the invention to provide a film image input system which provides a large freedom of design and can be reduced in both size and cost.

It is another object of the invention to provide a film image input system which can display which range of one frame an image being currently displayed on a monitor TV is, can improve the operationability thereof in the zooming and scanning operations thereof, and also can search easily and quickly for a frame to be looked at on a monitor TV from the film having a large number of frames.

In order to achieve the above objects, according to the invention, there is provided a film image input system which forms an image on a developed still photo film on a light receiving surface of an image pickup element through a mirror and a single focus lens, and outputs to a monitor TV an image signal photo-electrically converted by the image pickup element to thereby reproduce the film image on the screen of the monitor TV, the film image input system comprising: a rotary mechanism including the above-mentioned mirror, single focus lens and image pickup element and rotatable to thereby vary the length of an optical path from the above-mentioned photo film to the image pickup element; mirror drive means for rotating the mirror on the rotary mechanism and for moving the mirror in a direction of the optical axis of the single focus lens; lens drive means for moving the single focus lens on the rotary mechanism in the optical axis direction of the single focus lens; detect means for detecting the angle of rotation of the rotary mechanism; and control means, in accordance with the output of the detect means, for controlling the mirror drive means in such a manner that the light of the image of the photo film enters perpendicularly the image pickup element and for controlling the lens drive means in such a manner that the single focus lens is moved to a focusing position, wherein the film image is zoomed by means of rotation of the rotary mechanism.

Also, according to the invention, there is provided a film image input system which forms an image on a developed still photo film on a light receiving surface of an image pickup element by means of a zoomable taking lens, outputs to a monitor TV an image signal photo-electrically converted by the image pickup element to thereby reproduce the film image on the screen of the monitor TV, the film image input system comprising: at least a mirror interposed between the photo film and taking lens for bending the optical axis of the taking lens; mirror drive means for inclining the mirror in all directions; and, operation means for driving the mirror drive means in order to execute a desired scanning operation. Also, in the case of two mirrors, the system includes mirror drive means for controlling the mirror drive means to drive the two mirrors in such a manner that the two mirrors are inclined at a given relationship in order for the optical axis of the taking lens to intersect the surface of the photo film. Further, in the case of a mirror, the system includes film drive means which carries the photo film thereon and inclines the photo film in all directions, and means for. controlling the mirror drive means and film drive means in such a manner that the mirror and photo film are inclined at a given relationship in order for the optical axis of the taking lens to intersect the surface of the photo film.

Further, according to the invention, there is provided a film image input system which forms an image on a developed still photo film through a mirror and a zoomable taking lens on a light receiving surface of an image pickup element and outputs an image signal photo-electrically converted by the image pickup element to a monitor TV to thereby reproduce the film image on the screen of the monitor TV, the film image input system comprising: film feed means for feeding the frames of the photo film by feeding the photo film and for allowing scanning of the film image in a direction of feeding the film; mirror drive means for inclining the mirror only in one direction to thereby scan the film image in a direction perpendicular to the film feeding direction; and, operation means for driving the film feed means and mirror drive means to thereby execute a desired scanning operation.

Still further, according to the present invention, there is provided a film image input system which forms an image on a developed still photo film through a zoomable taking lens on a light receiving surface of an image pickup element and outputs a first image signal photo-electrically converted by the image pickup element to thereby reproduce the film image on the screen of a monitor TV, the film image input system comprising: a zoom mechanism for varying the image magnification of the taking lens; a scan mechanism for moving the photo film and taking lens to each other; operation means for outputting zoom information and scan information; control means for controlling the zoom and scan mechanisms in accordance with the zoom and scan information output from the operation means; an image memory for storing a second image signal representing an image of the whole of one frame of the photo film; frame generating means for generating a frame signal representing a trimming frame having a size and a position corresponding to the zoom and scan information in accordance with the zoom and scan information output from the operation means; and, image combining means, in accordance with the first and second image signals and the frame signal, for generating a third image signal to display in combination within one screen a picture displaying an image of the whole of one frame in combination with the trimming frame and a picture displaying only the image within the trimming frame, and for outputting the third image signal to the monitor TV. Also, the film image input system further includes image combining means for generating a third image signal to display a combined image composed of the image of the whole one frame and the trimming frame in accordance with the second image signal and the frame signal, and picture switch means for outputting either of the first and third image signals to the monitor TV. In addition, the film image input system further includes first memory means for storing the zoom information and scan information output from the operation means, second memory means for storing the zoom information and scan information to display the image of the whole of one frame; control means for controlling the zoom and scan mechanisms in accordance with the zoom information and scan information output from the first memory means or the second memory means; image combining means, in accordance with the first image signal and the frame signal, for generating a second image signal representing a combined image produced by combining a photographed image with the trimming frame; and, picture switch means for, during the trimming operation, outputting to the control means the zoom information and scan information stored in the second memory means and outputting the second image signal to the monitor TV, and, at the time of completion of the trimming operation, for outputting to the control means the zoom information and scan information stored in the first memory means and outputting the first image signal to the monitor TV.

Yet further, according to the present invention, there is provided a film image input system which forms an image on a developed still photo film through a zoomable taking lens on a light receiving surface of an image pickup element and outputs to a monitor TV an image signal photo-electrically converted by the image pickup element to thereby reproduce the film image on the screen of the monitor TV, the film image input system comprising: film feed means for taking up or rewinding the film frame by frame; instruction means for instructing creation of a multi-screen; an image memory for storing an image signal corresponding to one screen by means of n pieces of storage portions; image process means, when the multi-screen creation is instructed by the instruction means, operable to compress n pieces of frame image signals output from the image pickup element and then store the compress image signals in the n pieces of storage portions of the image memory; screen switch means for outputting to the monitor TV either of the image signal from the image pickup element or the image signal stored in the image memory; means for selecting one small screen of a multi-screen consisting of n pieces of small screens to be displayed on the monitor TV in accordance with the image signal stored in the image memory; and, control means, when the multi-screen creation is instructed by the instruction means, for controlling the film feed means so that n pieces of frames are photographed and controlling the screen switch means so that the image signal from the image memory is output to the monitor TV and, when a small screen is selected by the select means, for controlling the film feed means so that the frame of the small screen selected is photographed and controlling the screen switch means so that the image signal from the image pickup element is output to the monitor TV.

According to the present invention, there is used a single focus lens in place of an expensive zoom lens and a film image zooming operation is executed by rotation of a rotary mechanism. In other words, if the rotary mechanism is rotated, then the length of an optical path extending from the photo film to the image pickup element is varied, the mirror disposed on the rotary mechanism is also controlled in the rotation and position thereof so that the image light of the photo film can enter the image pickup element perpendicularly thereto, and the single lens is moved to a focusing position. This allows the zooming operation. Here, because the optical axis of the single focus lens is bent by the mirror, the system can be made compact. And, due to the fact that the image pickup element is rotated together with the rotary mechanism according to the movement of the mirror, no problem arises in mounting the CCD and in arranging wires.

According to another embodiment of the present invention, due to the fact that the optical axis of the taking lens is bent by at least one mirror, the whole system can be made compact and the freedom of design of the system can be increased and also, due to the fact that the scanning is executed by inclining the mirror, a space necessary for the scanning can be reduced to a minimum. Also, by inclining the two mirrors or the mirror and film at a given relationship so that the optical axis of the taking lens intersect perpendicularly the surface of the photo film, focusing can be achieved over the whole film surface even when the image magnification is increased. Further, the photo film feeding is used to feed the film frames and also to execute the scanning of the film image in the film feeding direction, and the inclination of the mirror in one direction is used to achieve the scanning of the film image in a direction perpendicular to the film feeding direction. Due to this, the mirror need be controlled only in one direction for the scanning operation.

According to still another embodiment of the present invention, the image combining means generates a third image signal to display two screens in combination within one screen of the monitor TV; one is a screen to display a combined picture of the image of the whole of one frame and the trimming frame, the other is a screen of the image being currently photographed within the trimming frame. When only the image within a necessary range is taken out from within one frame of the film and the image is trimmed to be displayed over the entire screen of the monitor TV, the third image signal is output to the monitor TV, whereby two screens, that is, a screen of a combined picture of the image of the whole of one frame and the trimming frame and a screen of the image being currently photographed within the trimming frame are displayed in combination within one screen of the monitor TV. Here, the image signal for the screen including the trimming frame combined therein is generated not only in accordance with a frame signal generated from the frame generating means in accordance with the zoom information and scan information output from the operation means but also in accordance with the above-mentioned second image signal.

Therefore, according to the trimming operation (the zoom information and scan information output from the operation means), the trimming frame is moved within the screen of the whole of one frame and the size of the frame is varied. By means of this, a desired trimming operation can be executed while observing the trimming frame within the screen of the whole of one frame. Also, after completion of the trimming operation, only the trimming image being currently photographed can be displayed by means of the screen switch means.

Also, according to yet another embodiment of the present invention, images of a plurality of frames can be displayed simultaneously in one screen of the monitor TV and the frame to be observed can be selected while watching the screen. In other words, if the multi-screen creation is instructed by the instruction means, then n pieces of frames are photographed by the taking lens while controlling the film feed means, in particular, the frame feeding of the film feed means. The image signal of each of n pieces of frames output from the image pickup element is compressed and the compressed image signal is then stored in an image memory having n pieces of storage portions as an image signal corresponding to one screen. And, if the image signals stored in the image memory are output to the monitor TV, then the images of n pieces of frames can be displayed as a multi-screen consisting of n pieces of small screens. Then, if one of the small screens is selected while watching the multi-screen, then the film feed means is controlled so that the image of the frame of the small screen selected is formed on the image pickup element through the taking lens. The image signal from the image pickup element is output to the monitor TV, so that the small screen selected can be displayed on the entire screen of the monitor TV.

BRIEF DESCRIPTION OF THE DRAWINGS

The exact nature of this invention, as well as other objects, features and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Detailed description will hereunder be given of the preferred embodiments of a film image input system according to the present invention with reference to the accompanying drawings.

[First Embodiment]

Figure 1:
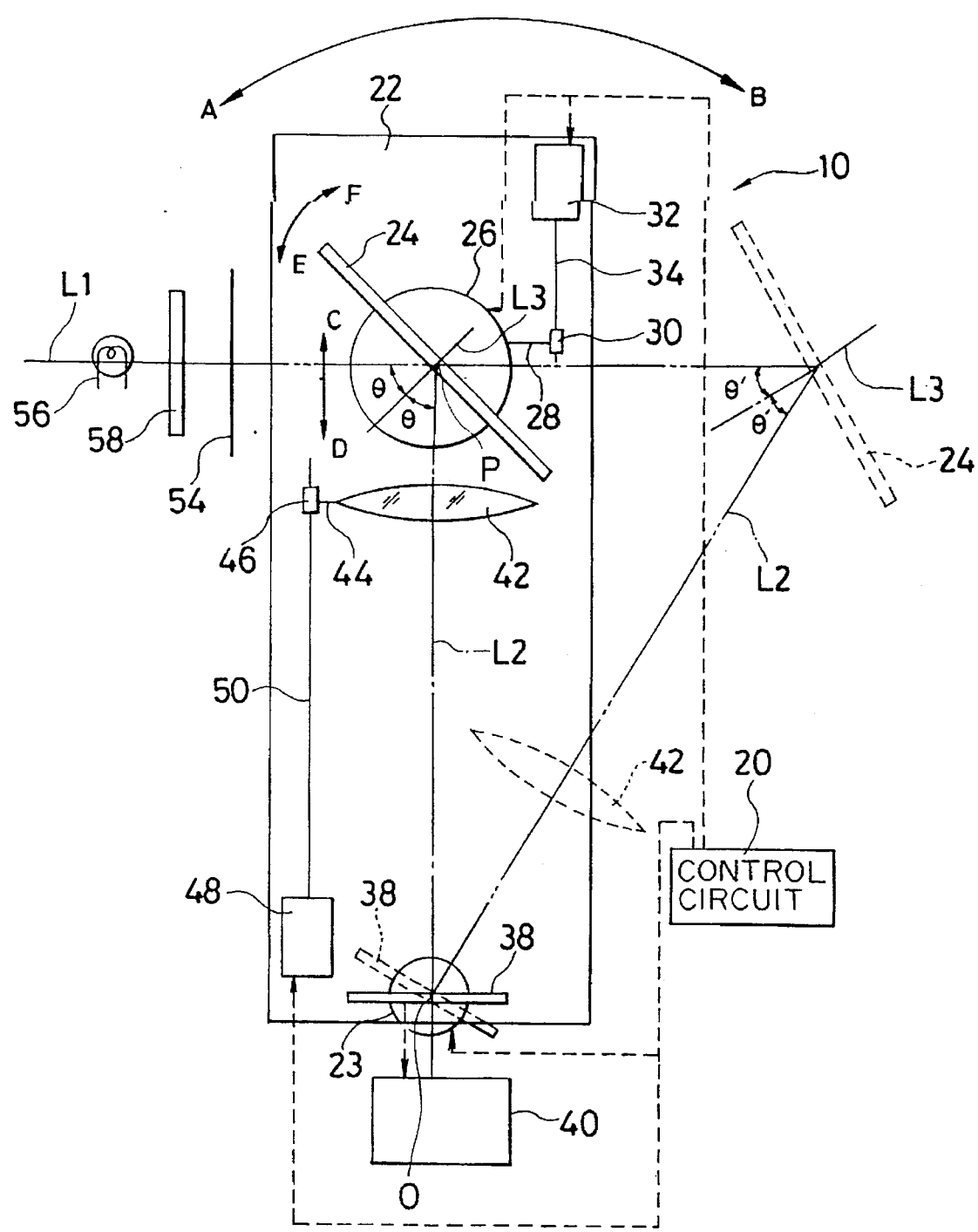
FIG. 1 is a block diagram of a first embodiment of a film image input system according to the invention.

In FIG. 1, there is shown a block diagram of a first embodiment of a film image input system according to the present invention. As shown in FIG. 1, the film image input system 10 mainly consists of a rotary plate 22, a rotary mechanism including a servo motor 23, a mirror mechanism including servo motors 26, 32, a lens drive mechanism including a servo motor 48, a control circuit 20, a lighting unit including a light source 56 and an diffusion plate 58, and other parts.

The rotary plate 22 forming the rotary mechanism is disposed in such a manner that it can be rotated about a center of rotation O in a direction of arrows A–B in FIG. 1, and the rotary plate 22 can be rotated in the arrows A–B direction by the servo motor 23 which is disposed in the neighborhood of the center of rotation O. To the rotation center O of the rotary plate 22 is fixed a CCD 38 which, if the rotary plate 22 is rotated by the servo motor 23, is then rotated in the arrows A–B direction together with the rotary plate 22. Here, it should be noted that an image process circuit 40 to process an electric signal output from the CCD 38 is connected to the CCD 38.

Also, the servo motor 26 forming the mirror drive mechanism is disposed in the rotary plate 22 in such a manner that it is free to move in a direction of arrows C–D in FIG. 1 and the servo motor 32 is fixed to the rotary plate 22. The servo motor 26 has an output shaft on which a mirror 24 is disposed, and the servo motor 26 is adapted to be able to rotate the mirror 24 about a point P in a direction of arrows E–F in FIG. 1. Also, a ball nut 30 is fixed through a shaft 28 to the servo motor 26 and the ball nut 30 is in threaded engagement with a ball screw 34 which is connected with the output shaft of the servo motor 32. Therefore, if the servo motor 32 is driven, then the mirror 24 is moved in the arrows C–D direction together with the servo motor 26.

Further, in the rotary plate 22, there is disposed a single focus lens 42 in such a manner that it is free to move in the arrows C–D direction. To the single focus lens 42 is fixed through a shaft 44 a ball nut 46, which ball nut 46 is in turn threadedly engaged with a ball screw 50 connected to the output shaft of the servo motor 48. For this reason, if the servo motor 48 is driven, then the single focus lens 42 is moved in the arrows C–D direction.

The control circuit 20 drives and controls the servo motors 23, 26, 32 and 48 in accordance with zoom signals from a zoom switch (which is not shown). In other words, the control circuit 20, when the rotary plate 22 is rotated, controls the moving position of the mirror 24 in the arrows C–D direction and the rotating position of the mirror 24 in the arrows E–F direction such that the image light of a developed still photo film 54 can enter perpendicularly a light receiving surface of the CCD 38 through the mirror 24 and single focus lens 42, and also controls the single focus lens 42 such that it is moved to a focusing position.

More particularly, assuming that a light ray passing through an image center of a film 54 and perpendicular the surface of the film is expressed as L1 and the optical axis of the single focus lens 42 (a light ray passing through the centers of the single focus lens 42 and CCD 38) is expressed as L2, the control circuit 20 controls the position of the mirror 24 so that the rotational center P of the mirror 24 is at a point where the light rays L1 and L2 intersect with each other, and also controls the angle of the mirror 24 so that an angle of incidence of light ray L1 onto the mirror 24 is equal to an angle of reflection of the light ray L2. Also, if a distance between the film 58 and the single focus lens 42 is expressed as a, a distance between the single focus lens 42 and the CCD 38 is expressed as b, and the focal distance of the single focus lens 42 is expressed as f, then the position of the single focus lens 42 is moved in such a manner that the following equation can be satisfied:

$$\frac{1}{f} = \frac{1}{a} + \frac{1}{b}$$

The moving positions and rotational angles of the rotary plate 22, mirror 24 and single focus lens 42 are respectively detected by a detector and the detect signals of the detector are respectively input to the control circuit 20. The control circuit 20, in accordance with the position and angle information input therein, controls such that the mirror 24 and single focus lens 42 are respectively at given positions and angles.

Also, if the mirror 24 is moved in such a manner to satisfy the above-mentioned condition, then the angle of rotation of the mirror 24 is one-half the angle of rotation of the rotary plate 22 and, for this reason, if the rotation is transmitted by means of a reduction mechanism such as a gear train or the like, there is eliminated the need to control the angle of rotation of the mirror 24.

Next, description will be given below of the operation of the film image input system of the invention constructed in the above-mentioned manner.

At first, a zoom switch on an operation panel is operated to input to the control circuit 20 a zoom signal which is used to zoom in or zoom out. The control circuit 20 drives the servo motor 23 of the rotary mechanism in accordance with the zoom signal input therein to thereby rotate the rotary plate 22.

The angle of rotation and the position of the mirror 24 as well as the position of the single focus lens 42 are determined fixedly with respect to the arbitrary angle of rotation of the rotary plate 22, and the control circuit 20 has a table in which data indicating the angle of rotation and the position of the mirror 24 as well as the position of the single focus lens 42 with respect to the angle of rotation of the rotary plate 22 are previously stored. The control circuit 20 reads out the respective data from the table in accordance with the angle of rotation of the rotary plate 22, and applies drive signals to the servo motors 26, 32 and 48 in accordance with the data read out so that the angle of rotation and the position of the mirror 24 as well as the position of the single focus lens 42 provide the angle and positions corresponding to the angle of rotation of the rotary plate 22.

By means of the above, for example, if the rotary plate 22 is rotated in a direction of an arrow B, then the mirror 24, single focus lens 42 and CCD 38 are respectively moved to positions shown by broken lines and the image magnification is decreased.

Figure 2:
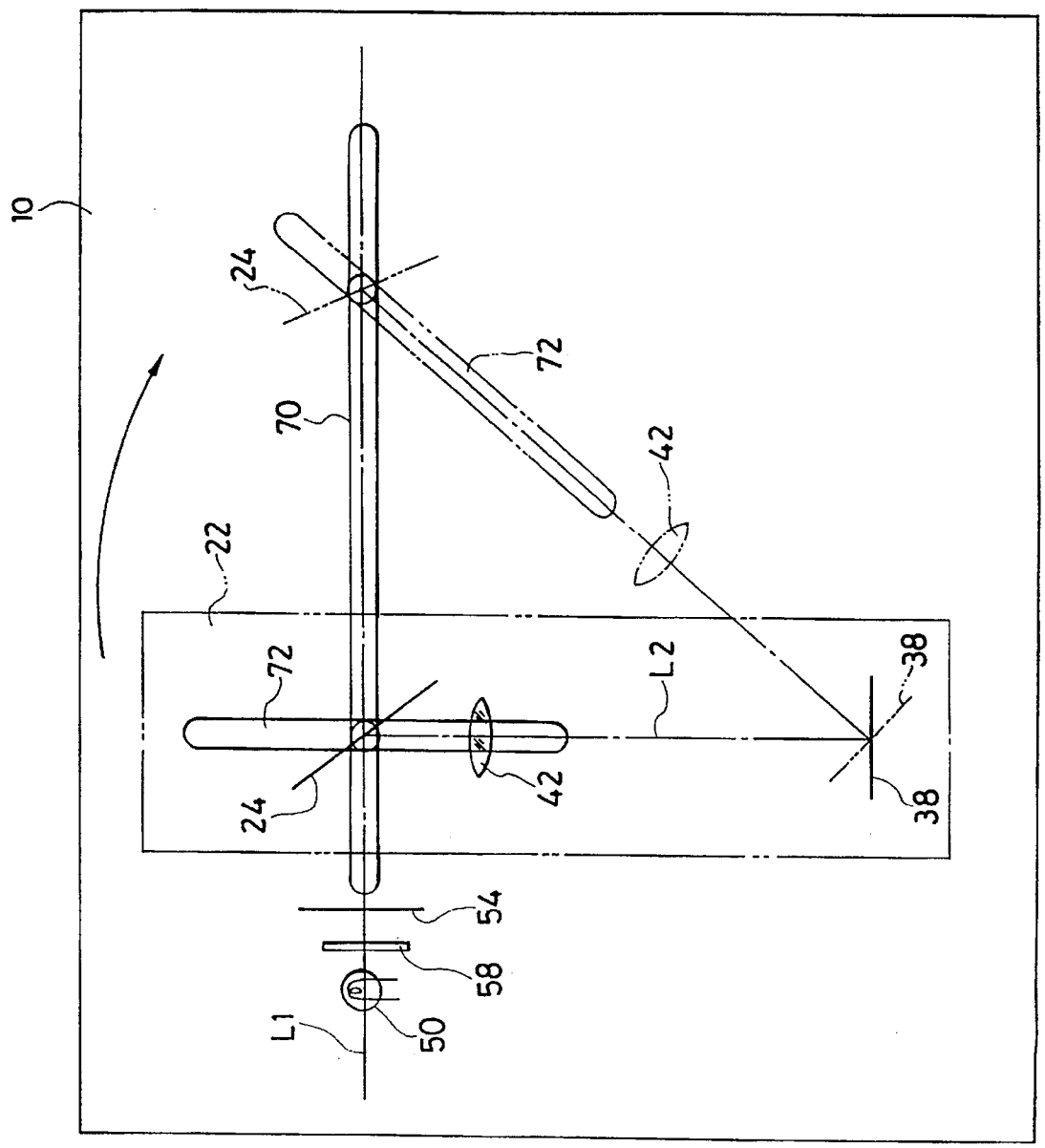
FIG. 2 is a view of a modification of the film image input system shown in FIG. 1.

Although in the above-mentioned embodiment the mirror 24 is moved in the arrows C–D direction by the servo motor 32, alternatively, as shown in FIG. 2, a guide groove 70 may be formed in the film image input system 10 and the shaft 74 of the mirror 24 may be inserted into a guide groove 72 of the rotary plate 22 and the guide groove 70. According to such structure, if the rotary plate 22 is rotated in a direction of an arrow A in FIG. 2, then the mirror 24 is moved along the guide groove 70.

[Second Embodiment]

Figure 3:
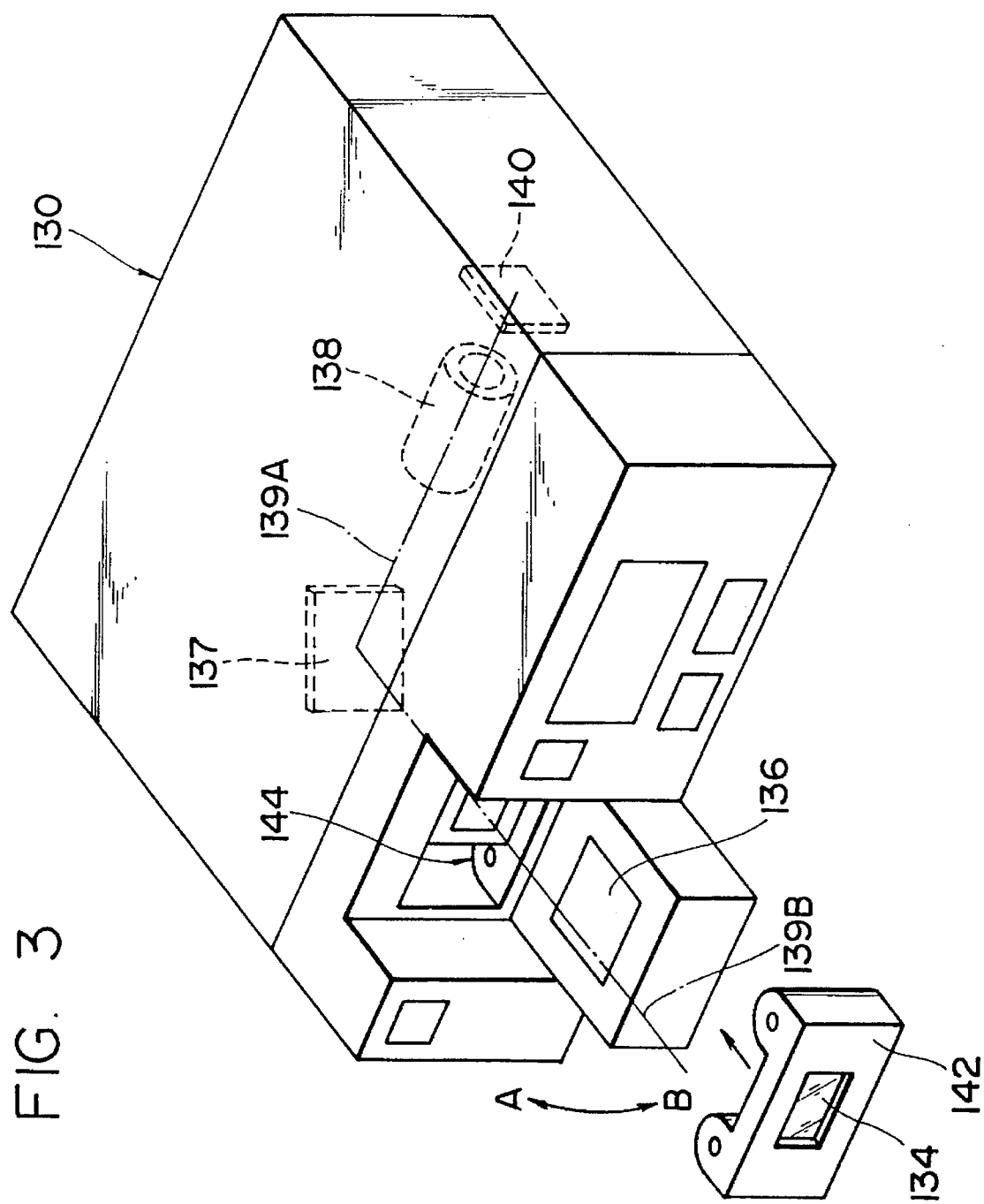
FIG. 3 is a perspective view of a second embodiment of a film image input system according to the invention.

Referring now to FIG. 3, there is shown a perspective view of a second embodiment of a film image input system according to the invention. As shown in FIG. 3, according to the present film image input system 130, a developed film 134 is illuminated by a light unit 136, and an image light is reflected by a mirror 137 (which will be described later) and an image on the film is picked up by an image pickup device including a taking lens 138 and CCD 140. That is, by providing the mirror 137, the optical axis 139A of the taking lens 138 can be bent substantially at right angles, which can increase the freedom of design of the whole system.

As the CCD 140, there is used a CCD for a reflected image, and an image signal photo-electrically converted by the CCD 140 is output to a monitor TV (not shown) so that a film image can be reproduced on the screen of the monitor TV.

Also, the film 134 is a developed negative or positive film and is stored in a film cartridge 142 having two shafts, and the film cartridge 142 is set in a cartridge storage portion 144.

The lighting unit 136 serves also as a cover for the cartridge storage part 144 and can be opened and closed in a direction of arrows A–B in FIG. 3. The lighting unit 136 includes a light source, a reflection plate and a diffusion plate: the reflection plate reflects a light projected from the light source on to the diffusion plate efficiently; and, the diffusion plate can turn out the reflected light into a diffusion light. The diffusion light illuminates the image of the film 134 and the thus illuminated film image is then guided to the taking lens 138.

Figure 4:
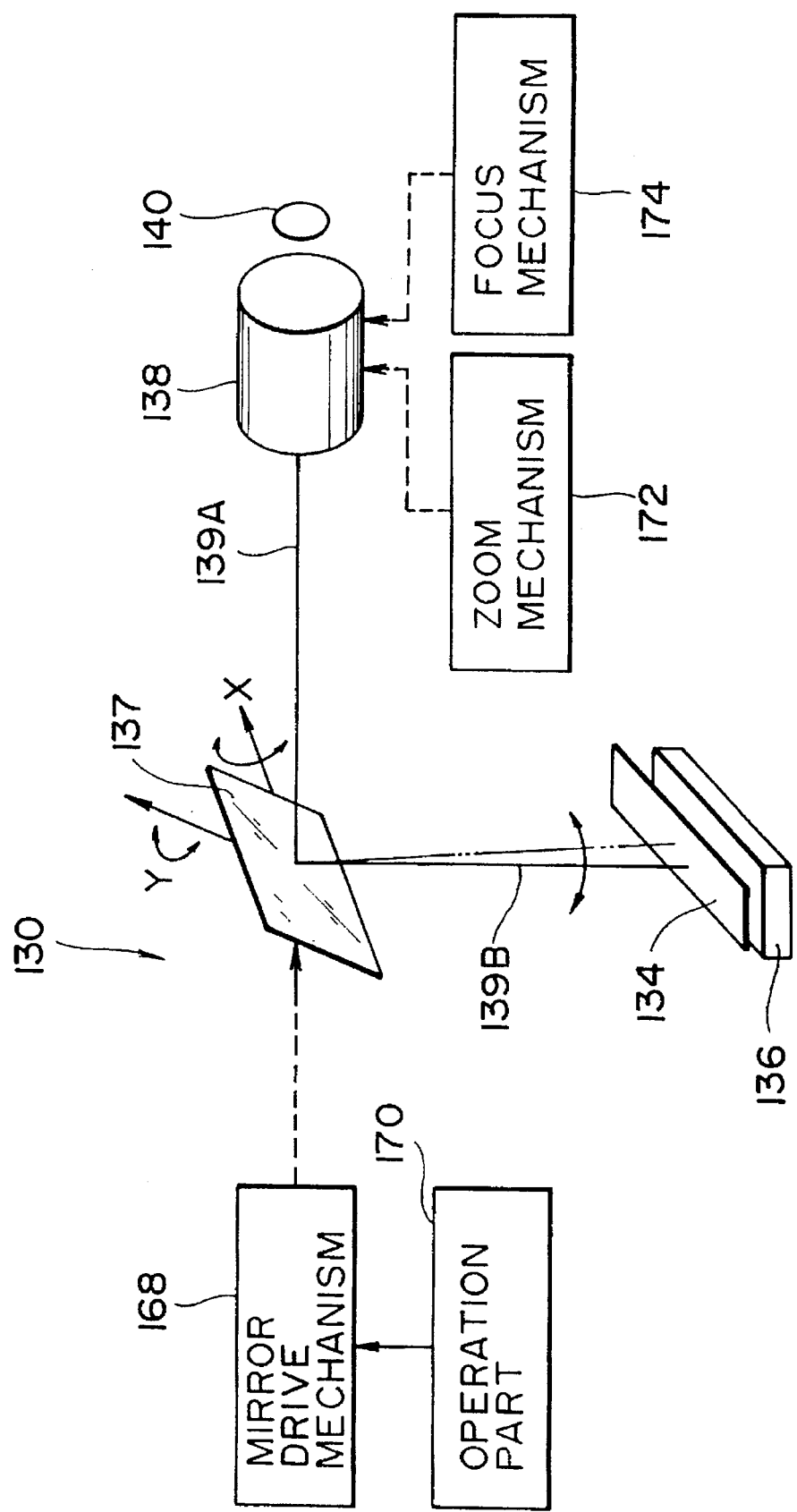
FIG. 4 is a block diagram of the structure of interiors of the film image input system shown in FIG. 3.
Figure 5:
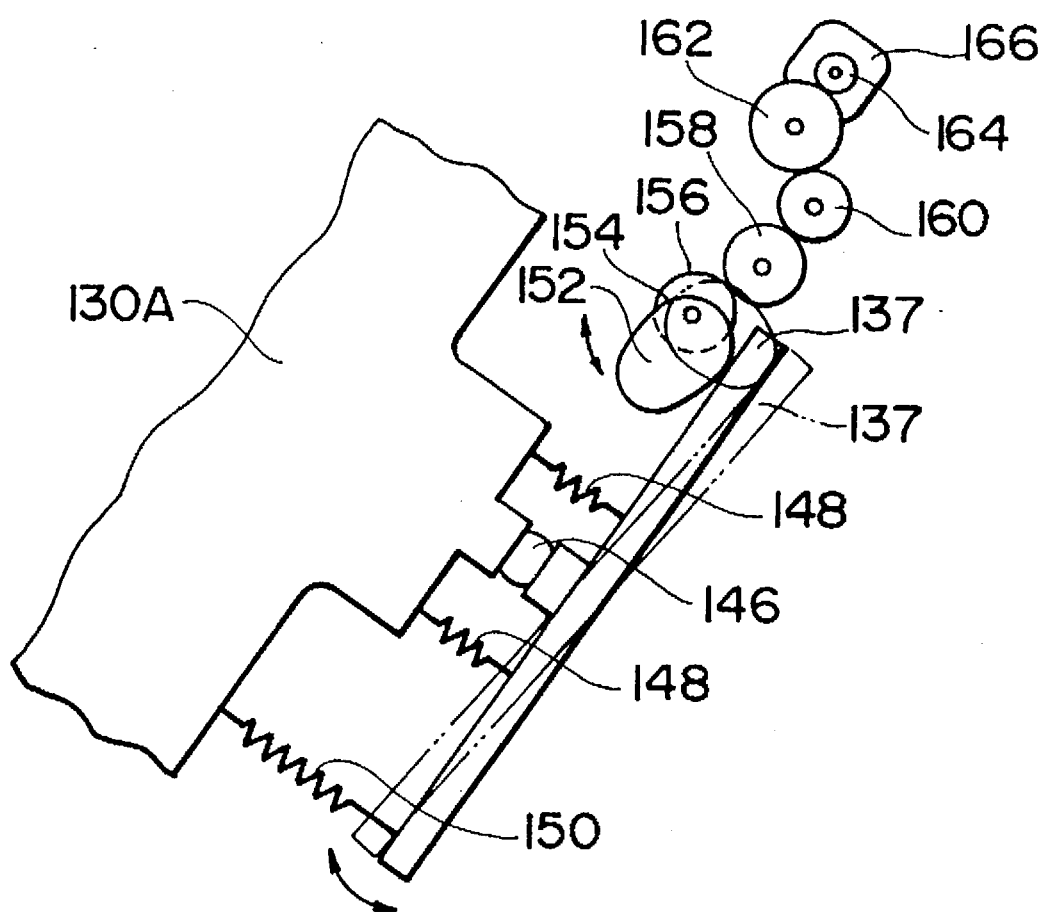
FIG. 5 is a view of details of a mirror and a mirror drive mechanism respectively shown in FIG. 4.

The above-mentioned mirror 137, as shown in FIG. 4, is disposed inclined on the optical axis 139A of the taking lens 138 and CCD 140 and is rotatable about X and Y axes existing on the same plane with the mirror 137. The X and Y axes are two axes which intersects perpendicularly with each other. That is, the mirror 137, as shown in FIG. 5, is disposed in a main body 130A of the film image input system 130 through a ball 146 in such a manner that it is free to incline in all directions. The mirror 137 is energized by springs 148, 148 such that it is pressed against the main body 130A, and the mirror 137 is also energized by a spring 150 in a counter clockwise direction in FIG. 5. Also, a cam surface of a cam 152 for the X axis is in contact with the mirror 137 on the X axis, and the cam 152 is disposed rotatable through a pin 154. To the pin 154 is fixedly secured a gear 156, which gear 156 is in turn connected through gears 158, 160, 162, 164 to a motor 166 for the X axis.

As described above, with reference to FIG. 5, description has been given of the mirror drive mechanism which rotates the mirror 137 about the X axis. However, a mirror drive mechanism to rotate the mirror about the Y axis is also constructed similarly. That is, the mirror drive mechanism 168 shown in FIG. 4 consists mainly of the cam 152 for the X axis, the motor 166 for the X axis and a cam for the Y axis, a motor for the Y axis, and the like. If the X axis motor 166 or the Y axis motor is driven, then the X axis cam 152 or the Y axis cam is rotated to thereby rotate the mirror 137 about the X axis or the Y axis.

Therefore, when the mirror 137 is rotated about the X axis, the operation part 170 (see FIG. 4) is operated to drive the X axis motor 166 of the mirror drive mechanism 168. By means of this, the rotational force of the X axis motor 166 is transmitted through the gears 164, 162, 160, 158, 156 to the cam 152 for the X axis. When the X axis cam 152 is rotated, then the mirror 137 is rotated about the X axis. Similarly, to rotate the mirror 137 about the Y axis, the operation part 170 may be operated to drive the Y axis motor of the mirror drive mechanism 168.

If the mirror 137 is rotated about the X axis and Y axis in this manner, then an optical axis 139B shown in FIG. 4 is caused to swing about the mirror 137 and, therefore, the optical axis 139B moves on the film 134. By means of this, the film image can be scanned. If the operation part 170 is operated to drive the zoom mechanism 172, the image magnification :can be changed. Also, the focus mechanism 46 is used to focus the zoom lens 12.

Accordingly, by driving the zoom mechanism 172 to select the image magnification properly and also by driving the mirror drive mechanism 168 to scan the film image, is possible to take out only the image within a necessary range from one frame of the film and to display (trim) the image over the entire screen of the monitor TV.

Although the CCD for a reflected image is used as the CCD 140 in the above-mentioned embodiment, this is not limitative but, if the film 134 is set inside out, then a CCD for other than a reflected image can also be used.

[Third Embodiment]

Figure 6:
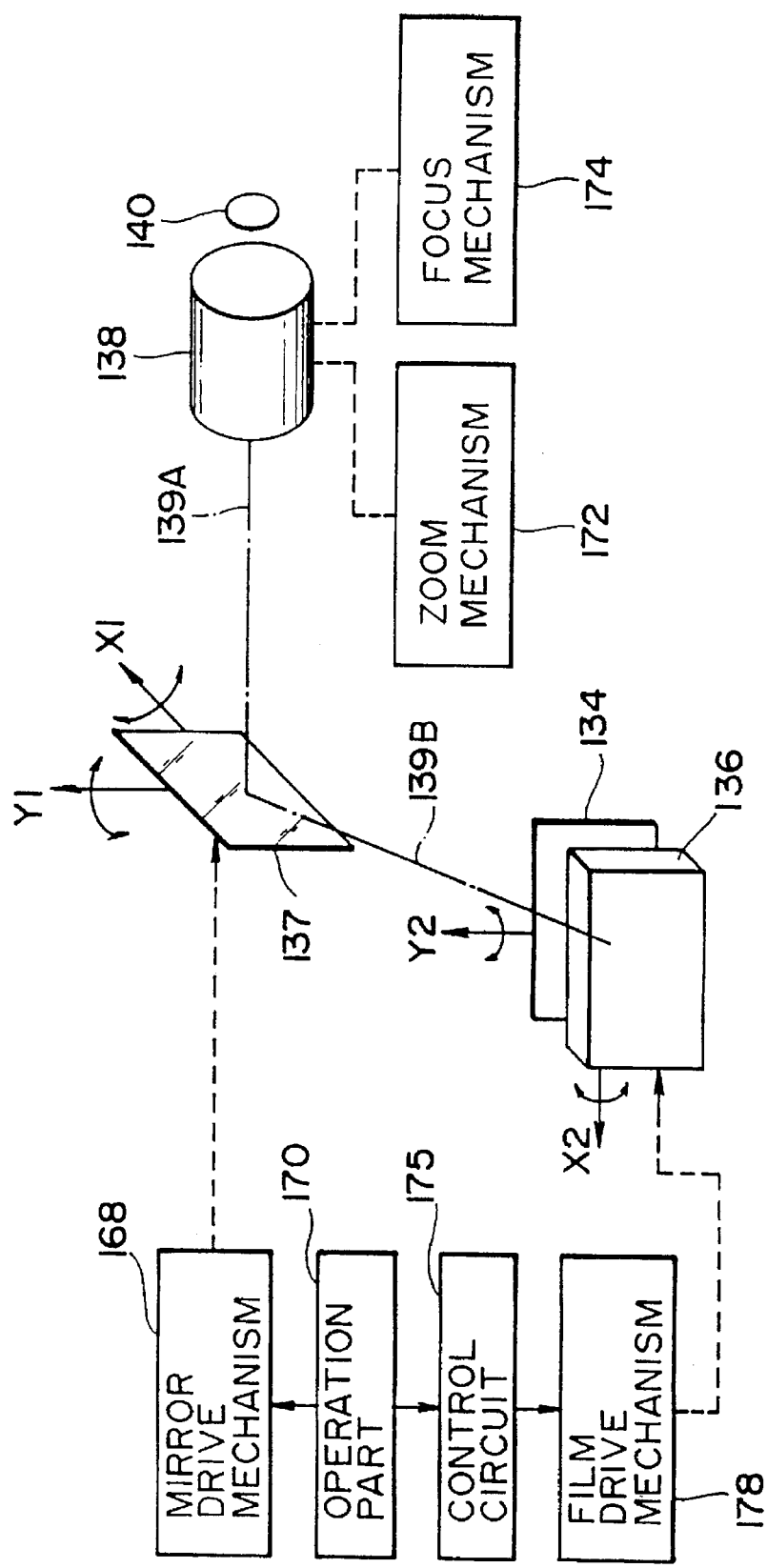
FIG. 6 is a block diagram of a third embodiment of a film image input system according to the invention.

Referring now to FIG. 6, there is shown a block diagram of a third embodiment of a film image input system according to the invention. In FIG. 6, parts used in common with the second embodiment shown in FIG. 4 are given the same designations and the detailed description thereof is omitted here.

The third embodiment of the present film image input system is different from the second embodiment mainly in that the film 134 is also inclined. In other words, in the second embodiment of the present film image input system, the optical axis 139B is swung as the film image is scanned and, for this reason, the optical axis 139B fails to intersect the film surface perpendicularly. Because of this, when the image magnification is great in which the depth of field is shallow, focusing cannot be achieved at a place where the angle of field of the trimming image is great. In view of this, according to the third embodiment of the present film image input system, the film 134 is inclined to the scanning in order for the optical axis 139B to intersect the film surface perpendicularly, thereby solving the above-mentioned problem found in the second embodiment.

As shown in FIG. 6, the mirror drive mechanism 168 rotates the mirror 137 about the X1 axis and Y1 axis to thereby swing the optical axis 139B so as to execute the scanning operation.

On the other hand, the film 134 is placed on film holding means (not shown) and the film holding means is constructed in such a manner that it can be rotated about the X2 axis and Y2 axis existing on the same plane with the film 134 and intersecting each other perpendicularly. A film drive mechanism 178 is constructed similarly to the mirror drive mechanism 168 (see FIG. 5). Therefore, if a motor for the X2 axis or a motor for the Y2 axis of the film drive mechanism 178 is driven, then a cam for the X2 axis or a cam for the Y2 axis is rotated to thereby rotate the film holding means, so that the film 134 is rotated about the X2 axis or Y2 axis.

Also, the operation part 170 outputs to the mirror drive mechanism 168 a signal to instruct an angle of rotation of the mirror 137 and at the same time outputs the signal to a control circuit 175. The control circuit 175, when the mirror 137 is driven to the angle of rotation instructed, controls the inclination of the film 134 through the film drive mechanism 170 so that the optical axis 139B to be bent by the mirror 137 can intersect the film surface perpendicularly.

Now, description will be given below of the operation of the film image input system in the above-mentioned manner.

Figure 7:
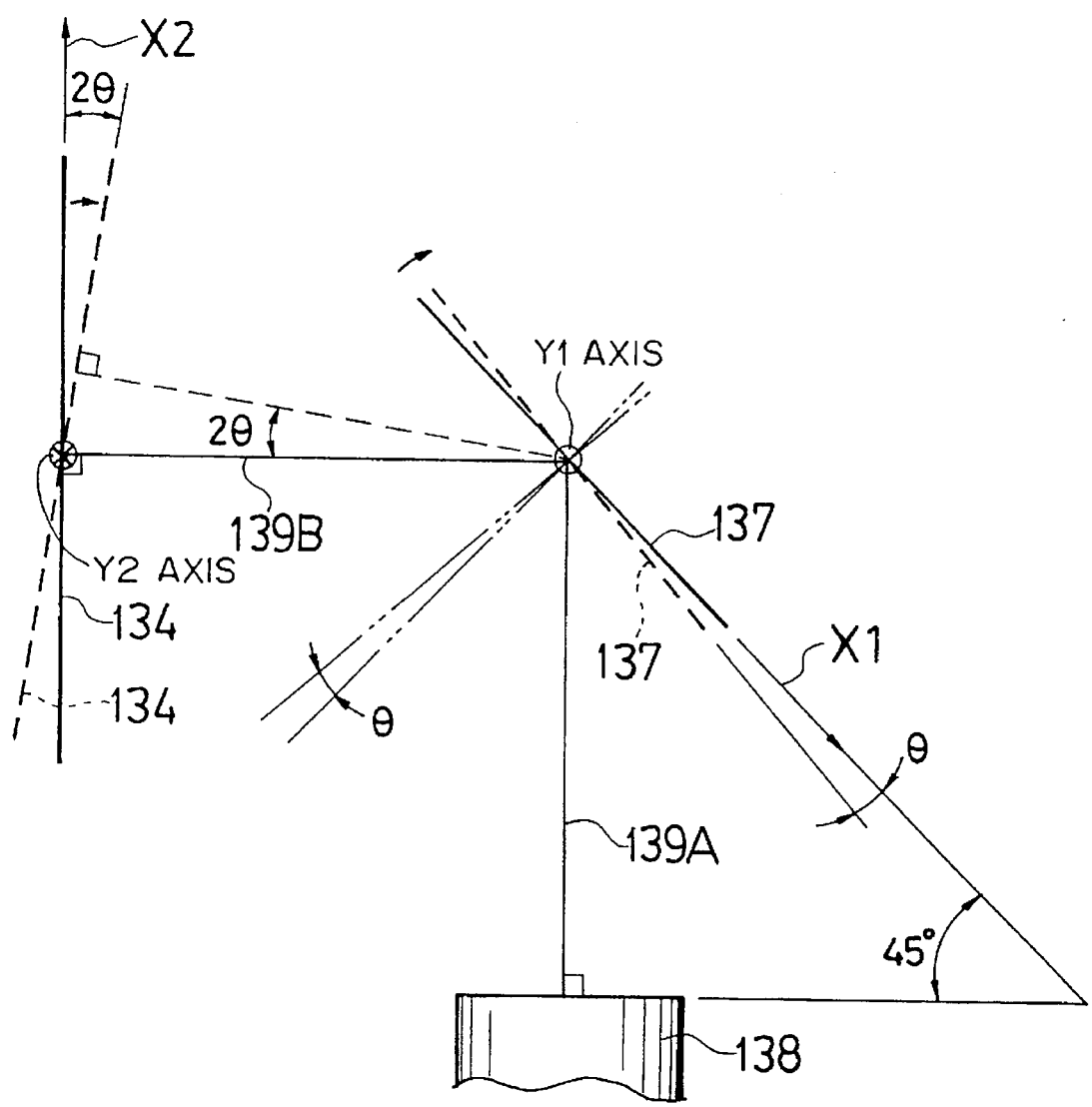
FIG. 7 is an explanatory view used to illustrate how to control a mirror when a transverse scanning operation is executed by the film image input system shown in FIG. 6.

At first, when scanning the image transversely, for example, if the operation part 170 is operated to rotate the mirror 137 θ° clockwise about the Y1 axis (see FIG. 7), then the control circuit 175 controls the film 134 to rotate $2_{\theta°}$ clockwise about the Y2 axis. That is, the operation part 170 applies to the mirror drive mechanism 168 a signal to rotate the mirror θ° clockwise. Responsive to this, the mirror drive mechanism 168 is operated to rotate the mirror 137 θ° clockwise about the Y1 axis, so that, as shown in FIG. 7, the optical axis 139B bent by the mirror 137 is rotated $2_{\theta°}$ clockwise.

On the other hand, the control circuit 175, when receiving the same instruction as the rotation instruction applied to the mirror drive mechanism 168 from the operation part 170, changes the instruction into an instruction to rotate the film 134 $2_{\theta°}$ clockwise about the Y2 axis and controls the film drive mechanism 178 in accordance with this new instruction. As a result of this, the film 134 is rotated $2_{\theta°}$ clockwise about the Y2 axis and the optical axis 139B rotated $2_{\theta°}$ by the mirror 137 is allowed to intersect the surface of the film 134 perpendicularly.

Also, although a longitudinal scanning is operated almost similarly to the transverse scanning, the longitudinal and transverse scannings are different from each other in the following respects: that is, in the case of the transverse scanning, the mirror 137 is rotated θ° clockwise about the Y1 axis and at the same time the film 134 is rotated $2_{\theta°}$ clockwise about the Y2 axis, while in the case of the longitudinal scanning the mirror 137 is rotated $\theta_x°$ clockwise about the X1 axis and $\theta_y°$ clockwise about the Y1 axis and at the same time the film 134 is rotated θ° counter clockwise about the X2 axis.

However, it should be noted here that an equation (1) must hold:

$$\theta_Y = \frac{1}{2}\left[\text{Tan}^{-1}\left[\frac{\sin\left\{\cos^{-1}\left(\frac{\cos\theta_x}{\sqrt{2}}\right)\right\}}{\sin\left\{\cos^{-1}(\sin^2\theta_x)-\cos^{-1}\left(\frac{\cos\theta_x}{\sqrt{2}}\right)\right\}}\right] - 45°\right] \quad (1)$$

$$\theta = \text{Tan}^{-1}\left[\frac{\sqrt{2}\,\tan\theta_x}{(\cos\theta_Y - \sin\theta_Y)\tan(45°-\theta_Y)}\right]$$

Here, description will be given of a manner to find the above-mentioned equation. At first, description will be given of a manner to rotate the mirror and film when the film is scanned in the Y2 axis direction.

Figure 8:
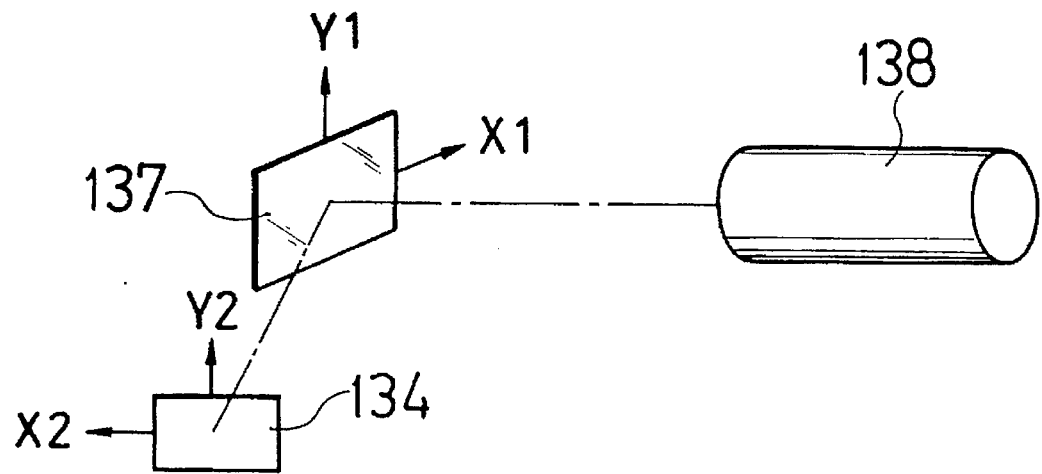
FIG. 8 is a perspective view of main portions of the film image input system shown in FIG. 6, illustrating a standard condition before a scanning operation is started by the film image input system.
Figure 9:
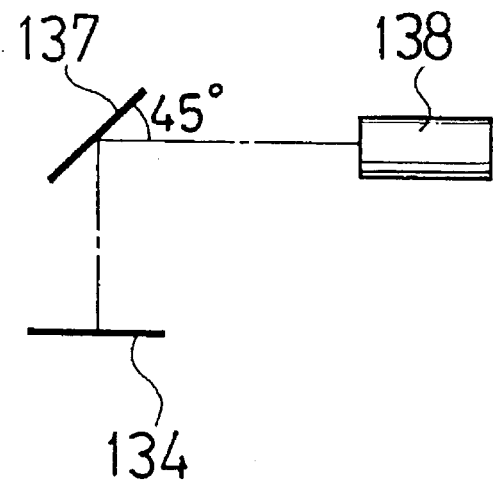
FIG. 9 is a plan view of FIG. 8.
Figure 10:
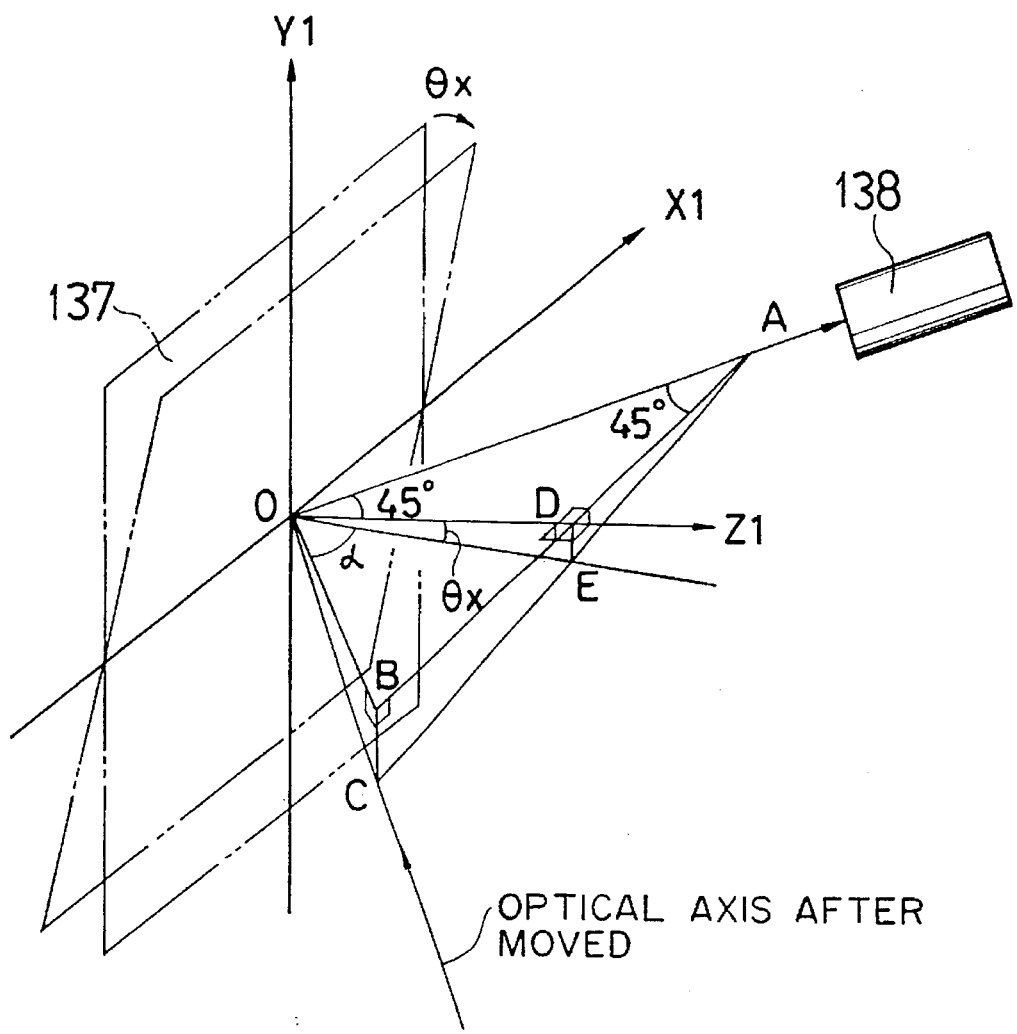
FIG. 10 is an explanatory view used to illustrate how an optical axis is moved when the mirror shown in FIG. 6 is rotated $\theta_x°$ clockwise round X1 axis.
Figure 11:
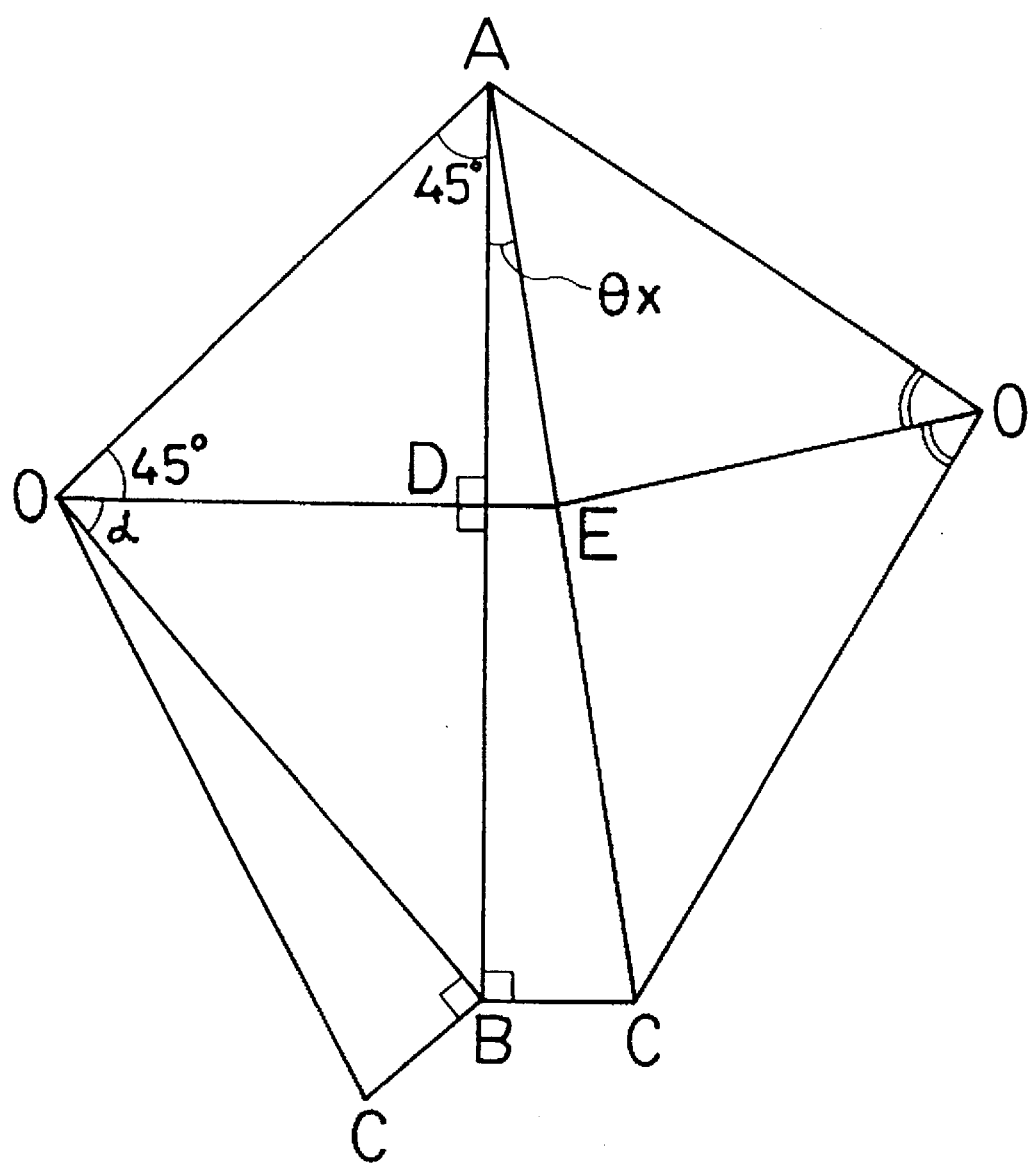
FIG. 11 is a developed view of a triangular pyramid O-ABC shown in FIG. 10.

When the mirror is rotated $\theta_x°$ clockwise about the X1 axis from the state thereof shown in FIGS. 8 and 9, then the optical axis of a light incident on the lens is caused to move between the film and mirror, as shown in FIG. 10. Here, assuming that an arbitrary point A is taken on the optical axis between the lens and mirror, an intersection point between a surface passing through A and parallel to X1, Y1 surfaces and an orthogonal projection of the optical axis on the X1, Y1 surfaces between the film and mirror is expresses as B, an intersection point with the optical axis between the film and mirror is expressed as C, an intersection point with the Z1 axis is expressed as D, and an intersection point with a normal of the mirror is expressed as E, then a triangular pyramid O-ABC can be obtained. A developed view of the triangular pyramid O-ABC is shown in FIG. 11. In FIG. 11,

DOA=OAD=45°, $OAD=ODB=ODE=ADE=ABC=OBC=90°$, $DOE=\theta_x$ here, assuming that $BOD=\alpha$, $DO=DA=L$, then $\alpha$ (that is, an angle of the light about the Y axis when the mirror is rotated $\theta_x$ clockwise about the X axis) can be obtained from the following equation:

$$\alpha = \text{Tan}^{-1}\left[\frac{\sin\{\cos^{-1}(\cos\theta_x/\sqrt{2}\,)\}}{\sin\{\cos^{-1}(\sin^2\theta_x)-\cos^{-1}(\cos\theta_x/\sqrt{2}\,)\}}\right] \quad (2)$$

That is, the following equation can be obtained:

$$OD=AD=L, \quad OA=\sqrt{2}\,L, \quad DE=L\tan\theta_x \quad (3)$$

$$AE=\frac{L}{\cos\theta_x}, \quad OE=\frac{L}{\cos\theta_x},$$

From a cosine theorem, the following equation (4) can be obtained:

$$\angle EOA = \angle EAO = \cos^{-1}\left(\frac{\cos\theta_x}{\sqrt{2}}\right), \quad (4)$$

$$\angle OEA = \cos^{-1}(\sin^{-2}\theta_x),$$

$$\angle OCE = \cos^{-1}(\sin^{-2}\theta_x) - \cos^{-1}\left(\frac{\cos\theta_x}{\sqrt{2}}\right)$$

From a sine theorem, the following equation (5) can be obtained:

$$EC = \frac{\sin\left(\cos^{-1}\left(\frac{\cos\theta_x}{\sqrt{2}}\right)\right)}{\cos\theta_x \sin\left(\cos^{-1}(\sin^{-2}\theta_x) - \cos^{-1}\left(\frac{\cos\theta_x}{\sqrt{2}}\right)\right)} L,$$

$$AC = \frac{\sin\left(\cos^{-1}\left(\frac{\cos\theta_x}{\sqrt{2}}\right)\right) + \sin\left(\cos^{-1}(\sin^2\theta_x) - \cos^{-1}\left(\frac{\cos\theta_x}{\sqrt{2}}\right)\right)}{\cos\theta_x \sin\left(\cos^{-1}(\sin^2\theta_x) - \cos^{-1}\left(\frac{\cos\theta_x}{\sqrt{2}}\right)\right)}$$

$$AB = AC\cos\theta_x = \frac{\sin\left(\cos^{-1}\left(\frac{\cos\theta_x}{\sqrt{2}}\right)\right) + \sin\left(\cos^{-1}(\sin^2\theta_x) - \cos^{-1}\left(\frac{\cos\theta_x}{\sqrt{2}}\right)\right)}{\sin\left(\cos^{-1}(\sin^{-2}\theta_x) - \cos^{-1}\left(\frac{\cos\theta_x}{\sqrt{2}}\right)\right)} L$$

$$BD = AB - AD = \frac{\sin\left(\cos^{-1}\left(\frac{\cos\theta_x}{\sqrt{2}}\right)\right)}{\sin\left(\cos^{-1}(\sin^{-2}\theta_x) - \cos^{-1}\left(\frac{\cos\theta_x}{\sqrt{2}}\right)\right)} L$$

$$\tan\alpha = \frac{\sin\left(\cos^{-1}\left(\frac{\cos\theta_x}{\sqrt{2}}\right)\right)}{\sin\left(\cos^{-1}(\sin^2\theta_x) - \cos^{-1}\left(\frac{\cos\theta_x}{\sqrt{2}}\right)\right)} \quad (5)$$

$(\because 0 < \theta_x < 45°)$

Figure 12:
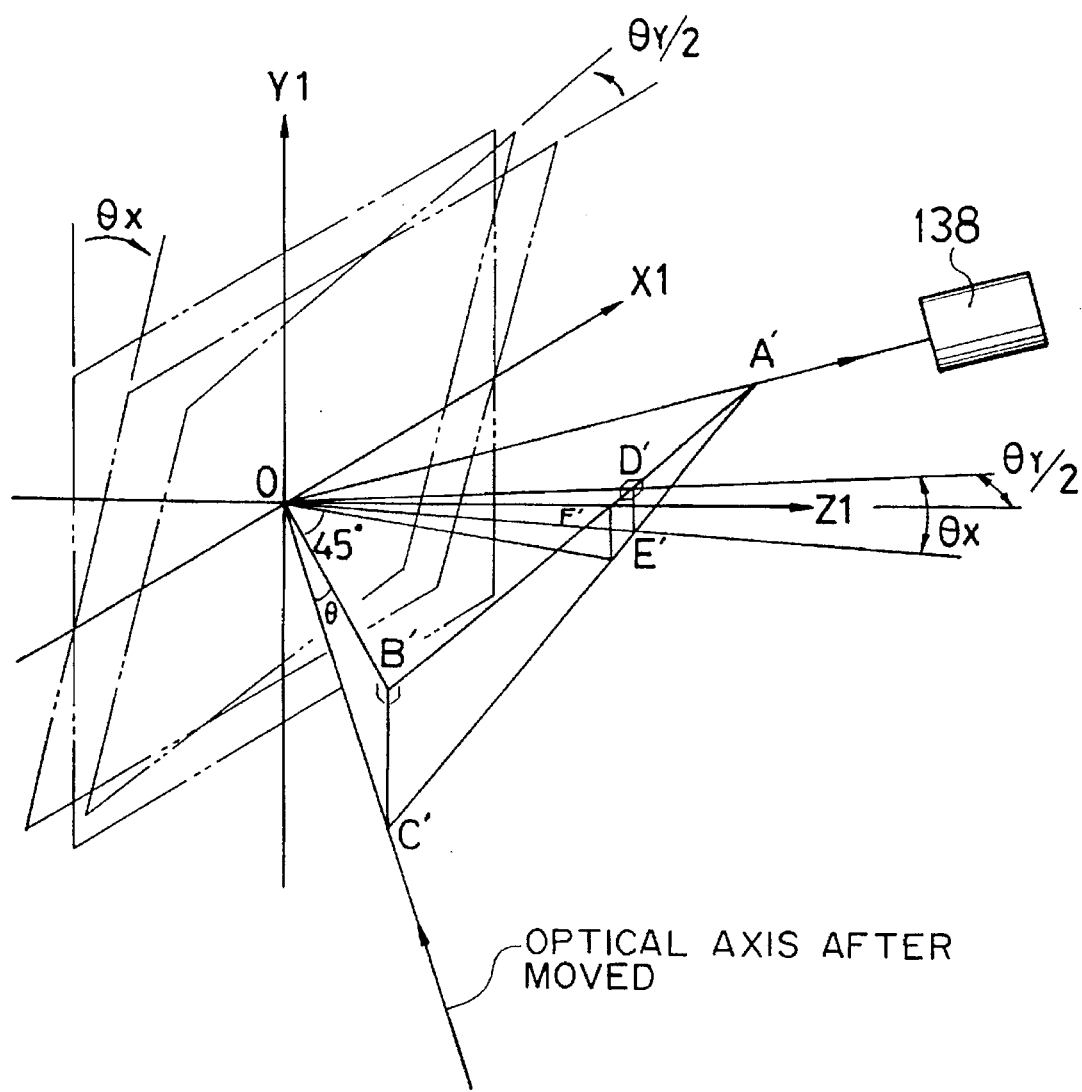
FIG. 12 is an explanatory view used to illustrate how to control a mirror when a longitudinal scanning operation is executed by the film image input system shown in FIG. 6.

Next, as shown in FIG. 12, if the mirror is rotated $\theta_y/2$ clockwise about the Y1 axis in order that an angle formed between the orthogonal projection of the optical axis on the X1, Y1 surfaces between the film and mirror and the Z1 axis is 45°, then the following equation is obtained:

$\theta_y=\alpha-45°$

Figure 13:
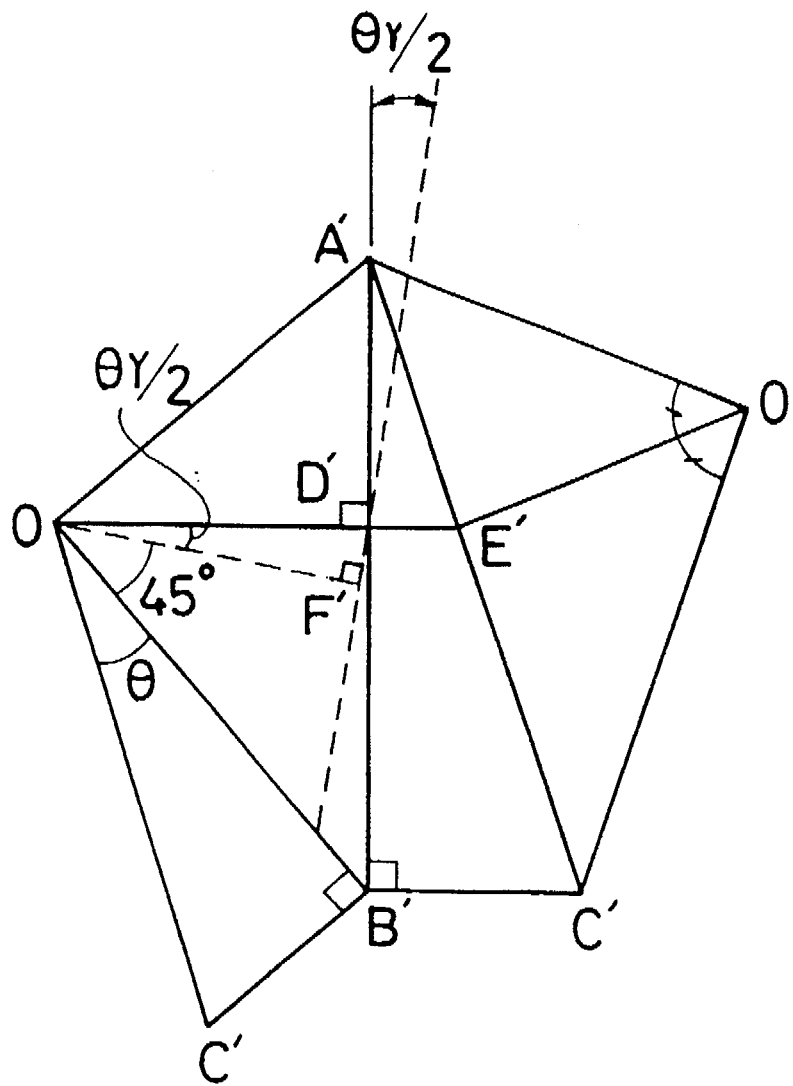
FIG. 13 is a developed view of a triangular pyramid O-A' B' C' shown in FIG. 12.

Also, if an intersection point of a plane passing through an arbitrary point A' on the optical axis between the lens and mirror and parallel to the X1, Y1 planes with respect to the orthogonal projection of the optical axis on the X1, Z1 planes between the film and mirror is expressed as B', an intersection point of the above plane with respect to the optical axis between the film and mirror is expressed as C', an intersection point of the above plane with respect to the normal of the mirror is expressed as E', and an intersection point of the above plane with respect to the orthogonal projection on the X1, Z1 planes is expressed as D', then a triangular pyramid O-A' B' C' can be obtained. In FIG. 13, there is shown a developed view of the thus obtained triangular pyramid O-A' B' C'. In FIG. 13, if an intersection point of A' B' with respect to the Z1 axis is expressed as F' and B'OC'=$\theta$° (that is, an angle $\theta$ formed between the X1, Z1 planes and the optical axis obtained when an angle of the light round the Y1 axis after the mirror is rotated $\theta_x$), then the following equation (6) can be obtained:

$$\theta = \text{Tan}^{-1}\left[\frac{\sqrt{2} \tan\theta_x}{\{\cos(\theta_Y/2) - \sin(\theta_Y/2)\}\tan(45° - \theta_Y/2)}\right] \quad (6)$$

Figure 14:
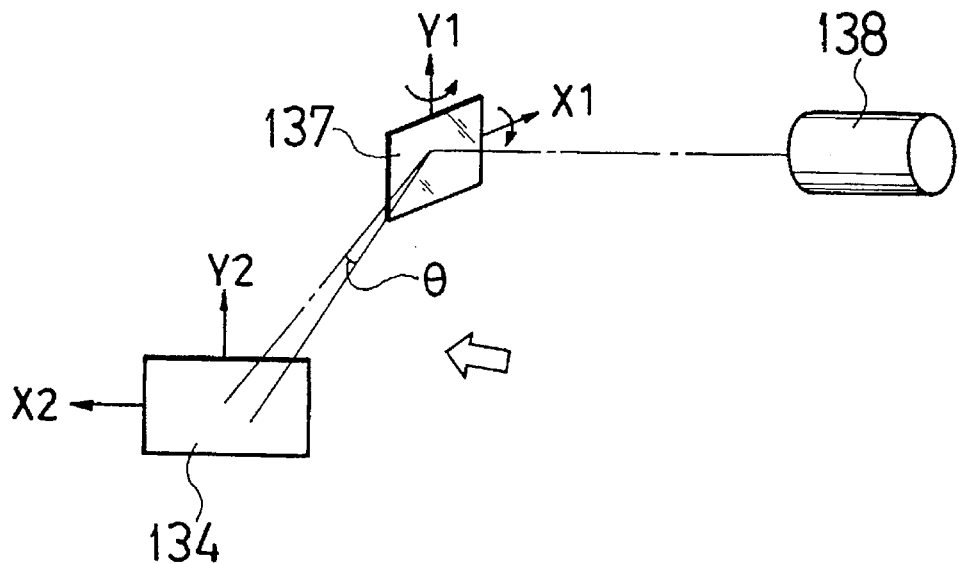
FIG. 14 is a perspective view used to illustrate how the mirror and film are moved when the longitudinal scanning operation is executed by the film image input system shown in FIG. 6.
Figure 15:
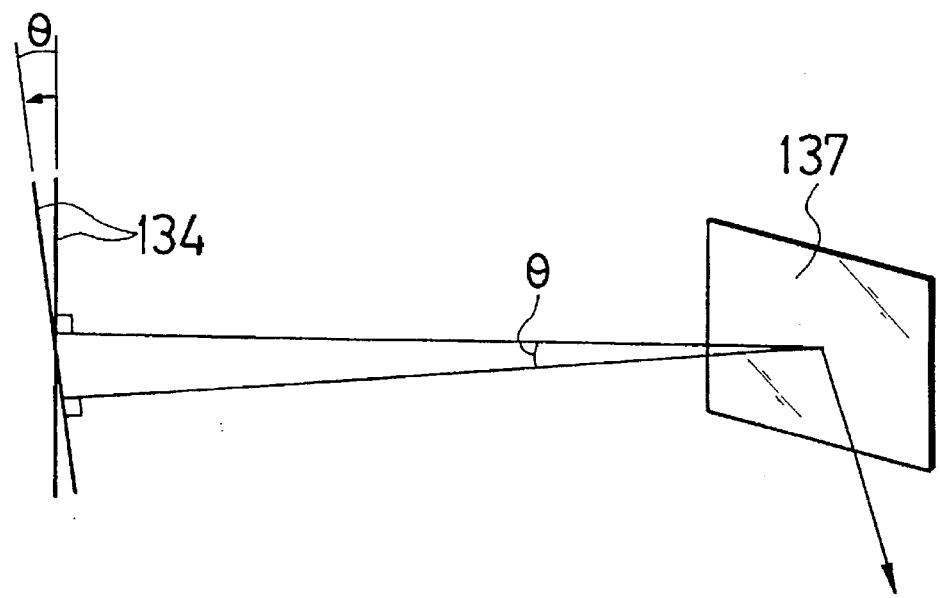
FIG. 15 is an arrow view of FIG. 14.

Accordingly, in order to make the film surface perpendicular with respect to the optical axis, the film surface may be rotated θ° counter clockwise about the X2 axis. Here, FIG. 14 is a perspective view to illustrate how the mirror and film are rotated, and FIG. 15 is an arrow view of FIG. 14, seen from a direction of an arrow. In this manner, the film can be scanned in the longitudinal direction thereof. Now, θ of the equation (6) can be obtained according to the following equation (7): that is, $$OF' = L'$$

$$OD' = \frac{L'}{\cos(\theta_Y/2)}$$

$$D'E = \frac{L'}{\cos(\theta_Y/2)} \tan\theta_x$$

$$A'D' = \frac{L'}{\cos(\theta_Y/2)} \tan(45° - \theta_Y/2)$$

$$B'D' = \frac{L'}{\cos(\theta_Y/2)} \tan(45° + \theta_Y/2)$$

$$A'B' = A'D' + B'D' = \frac{L'}{\cos(\theta_Y/2)} \cdot \frac{2}{(\cos^2(\theta_Y/2)) - \sin^2(\theta_Y/2)}$$

$$B'C' = D'E \times \frac{A'B'}{A'D'} = \frac{L'}{\cos(\theta_Y/2)} \tan\theta_x \frac{2}{(\cos^2(\theta_Y/2)) - \sin^2(\theta_Y/2)\tan(45° - \theta_Y/2)}$$

$$O'B' = \frac{L'}{\cos(\theta_Y/2)} /\sin(45° - \theta_Y/2)$$

$$\tan\theta = \frac{B'C'}{O'B'} = \tan\theta_x \frac{2\sin(45° + \theta_Y/2)}{(\cos^2(\theta_Y/2)) - \sin^2(\theta_Y/2)\tan(45° - \theta_Y/2)} \quad (7)$$

$$= \tan\theta_x \frac{\sqrt{2}}{(\cos(\theta_Y/2)) - \sin(\theta_Y/2)\tan(45° - \theta_Y/2)}$$

$$\therefore \theta = \text{Tan}^{-1}\left[\frac{\sqrt{2} \tan\theta_x}{(\cos(\theta_Y/2)) - \sin(\theta_Y/2)\tan(45° - \theta_Y/2)}\right]$$

$$\theta_Y = \alpha - 45° = \text{Tan}^{-1}\left[\frac{\sin(\cos^{-1}(\cos\theta_x/\sqrt{2}))}{\sin(\cos^{-1}(\sin^2\theta_x) - \cos^{-1}(\cos\theta/\sqrt{2}))}\right] - 45°$$

As described above, by rotating the mirror 137 and film 134 at a given relationship, the optical axis 139B can be made to intersect the film 134 perpendicularly, with the result that focusing can be achieved over the whole trimming image even when the image magnification is great.

Figure 16:
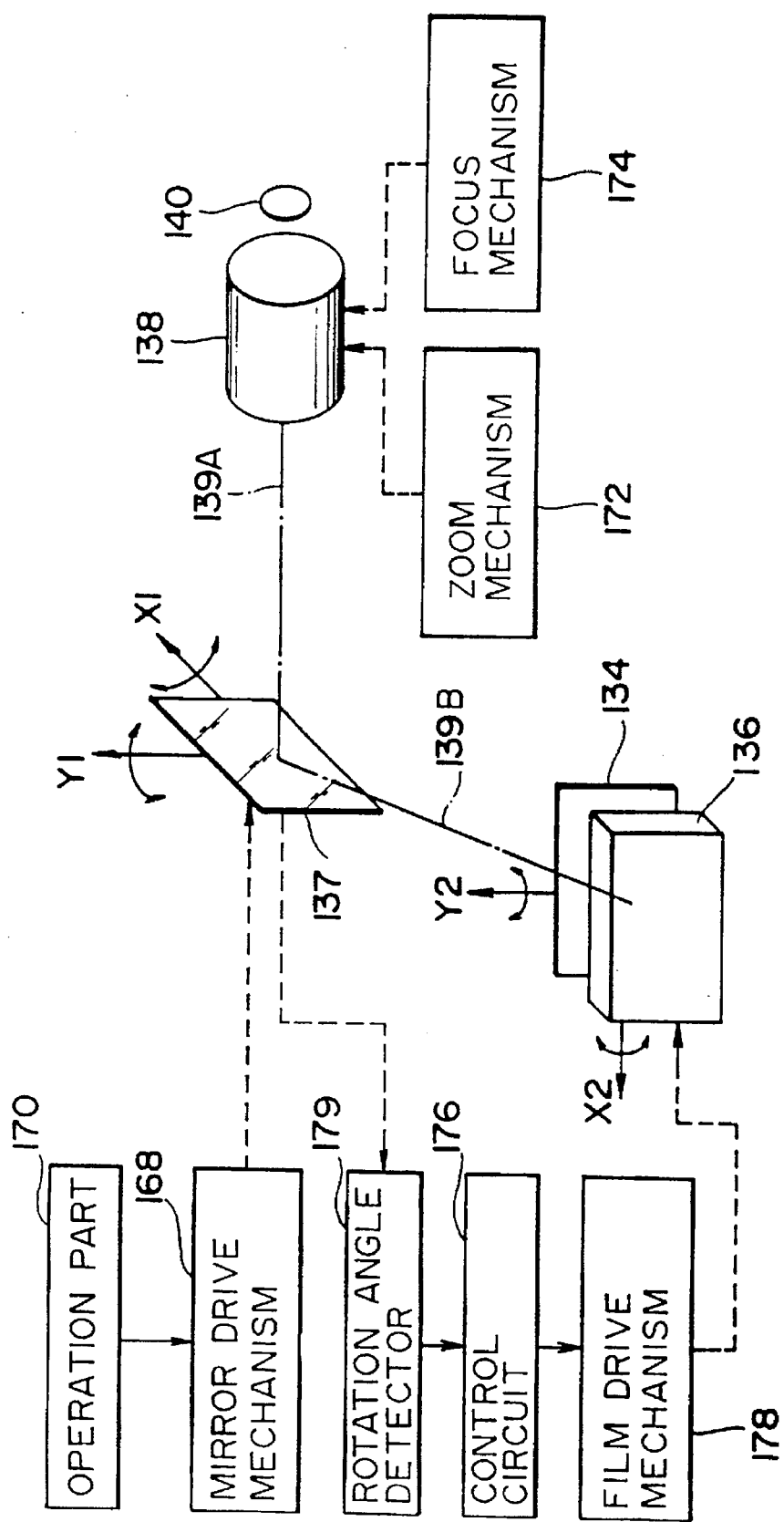
FIG. 16 is a block diagram of a modification of the film image input system shown in FIG. 6.

In FIG. 16, there is shown a block diagram of a modification of the film image input system shown in FIG. 6. In FIG. 16, parts used in common with FIG. 6 are given the same designations and the detailed description thereof is omitted here.

According to the film image input system shown in FIG. 6, the signal to indicate the angle of rotation of the mirror 137 is input from the operation part 170 to the control circuit 175, while according to the film image input system shown in FIG. 16, there is provided a rotation angle detector 179, the angle of rotation of the mirror 137 is detected by use of the rotation angle detector 179, and a signal to indicate the angle of rotation of the mirror 137 is then applied to a control circuit 176.

[Fourth Embodiment]

Figure 17:
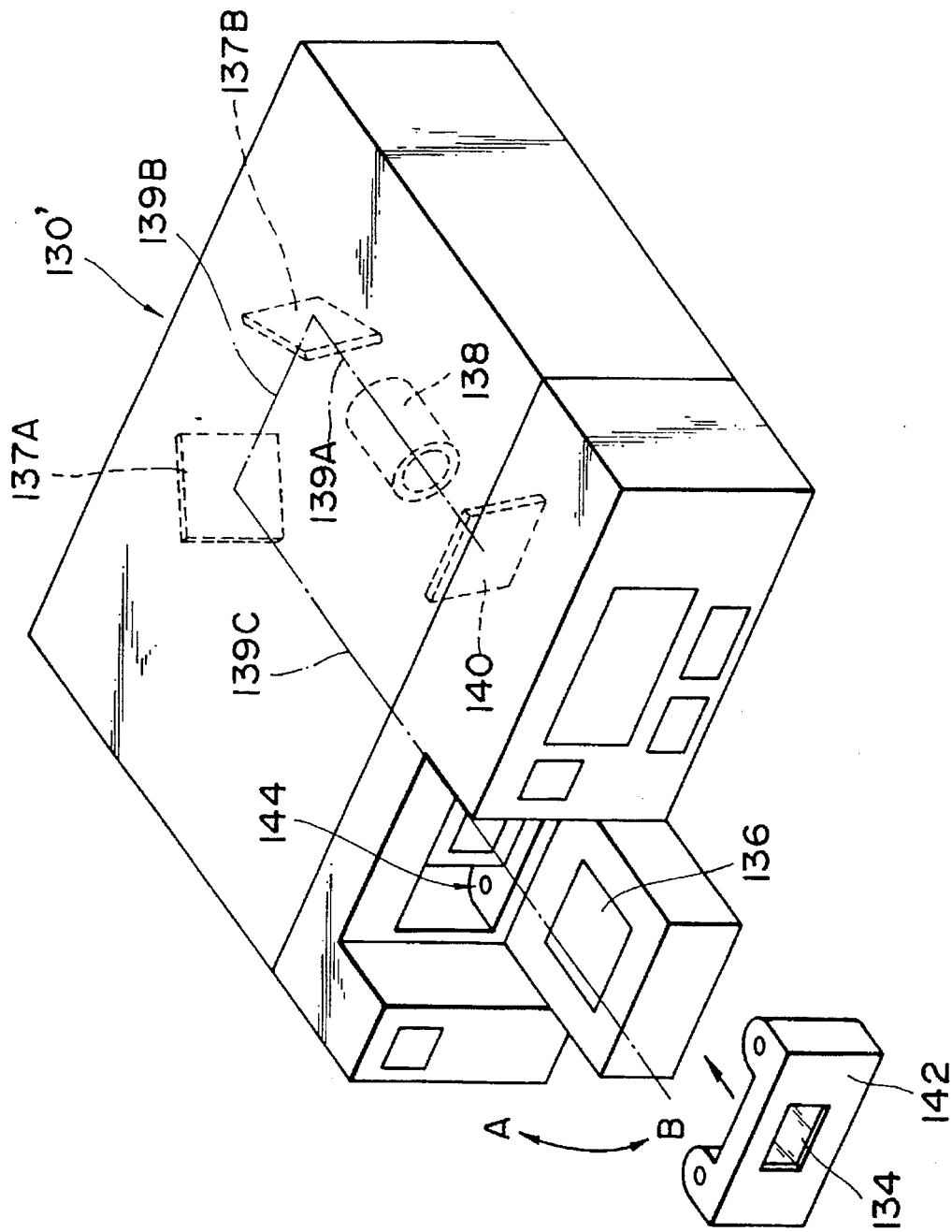
FIG. 17 is a perspective view of a fourth embodiment of a film image input system according to the invention.

Referring now to FIG. 17, there is shown a perspective view of a fourth embodiment of a film image input system according to the invention. In FIG. 17, parts used in common with FIG. 3 are given the same designations and the detailed description is omitted here.

The film image input system shown in FIG. 17 is different from the film image input system 130 shown in FIG. 3 in that it uses 2 mirrors 137A, 137B to bend the optical axis of the taking lens 138.

In other words, due to provision of the two mirrors 137A, 137B interposed between the lighting unit 136 and taking lens 138, the optical axis 139A of the taking lens 138 can be bent substantially in a U shape and thus the freedom of design of the whole system can also be increased.

Figure 18:
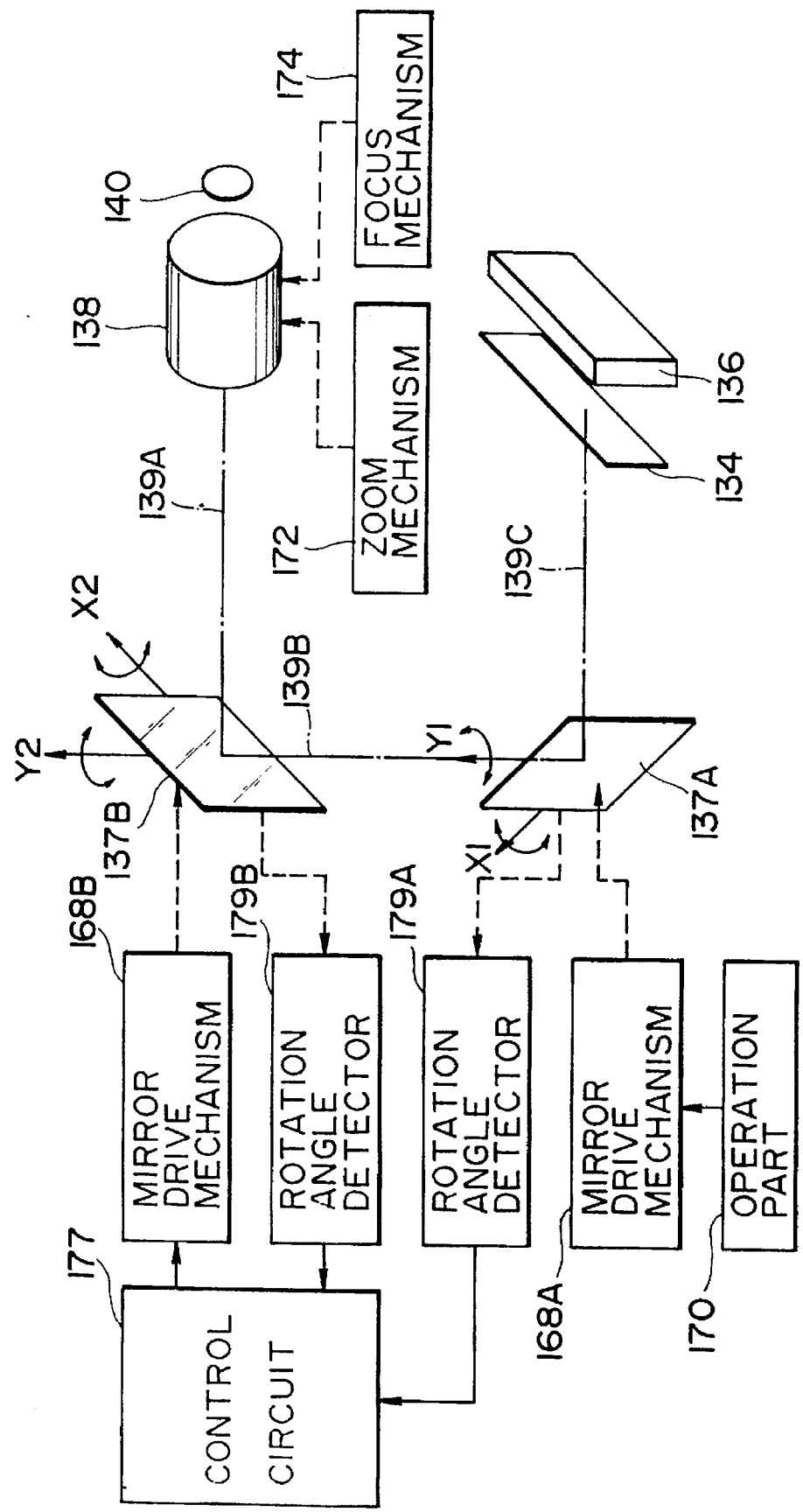
FIG. 18 is a block diagram of the structure of interiors of the film image input system shown in FIG. 17.

In FIG. 18, there is shown a block diagram of the structure of interiors of the film image input system shown in FIG. 17.

In FIG. 18, parts used in common with the film image input system shown in FIG. 6 are given the same designations and the detailed description thereof is omitted here.

The mirror 137B, as shown in FIG. 18, is disposed inclined on the optical axis 139A of the taking lens 138 and CCD 140 and is rotatable about the X2 axis and Y2 axis on the same plane with the mirror 137B. Also, the mirror 137A, as shown in FIG. 18, is disposed inclined on the optical axis 139B which is reflected by the mirror 137B and is bent substantially at right angles, and is rotatable about the X1 axis, Y1 axis on the same plane with the mirror 137A. And, the mirror 137A can be inclined about the X1 axis and Y1 axis by a mirror drive mechanism 168A, while the mirror 137B can be inclined about the X2 axis and Y2 axis by a mirror drive mechanism 168B.

The operation park 170 is able to output to the mirror drive mechanism 168A a signal for instruction of scanning to thereby drive the mirror drive mechanism 168A. The rotation angle detectors 179A, 179B respectively detect the angles of rotation of the mirrors 137A, 137B and output to the control circuit 177 signals which indicate the angles of rotation detected. And, in accordance with the detected rotation angles from the angle rotation detectors 179A, 179B, the control circuit 177 controls the mirror drive mechanism 168B so that the optical axis 139C bent by the mirror 137A can intersect the film surface perpendicularly.

Description will be given below of the operation of the film image input system constructed in the above mentioned manner.

Figure 19:
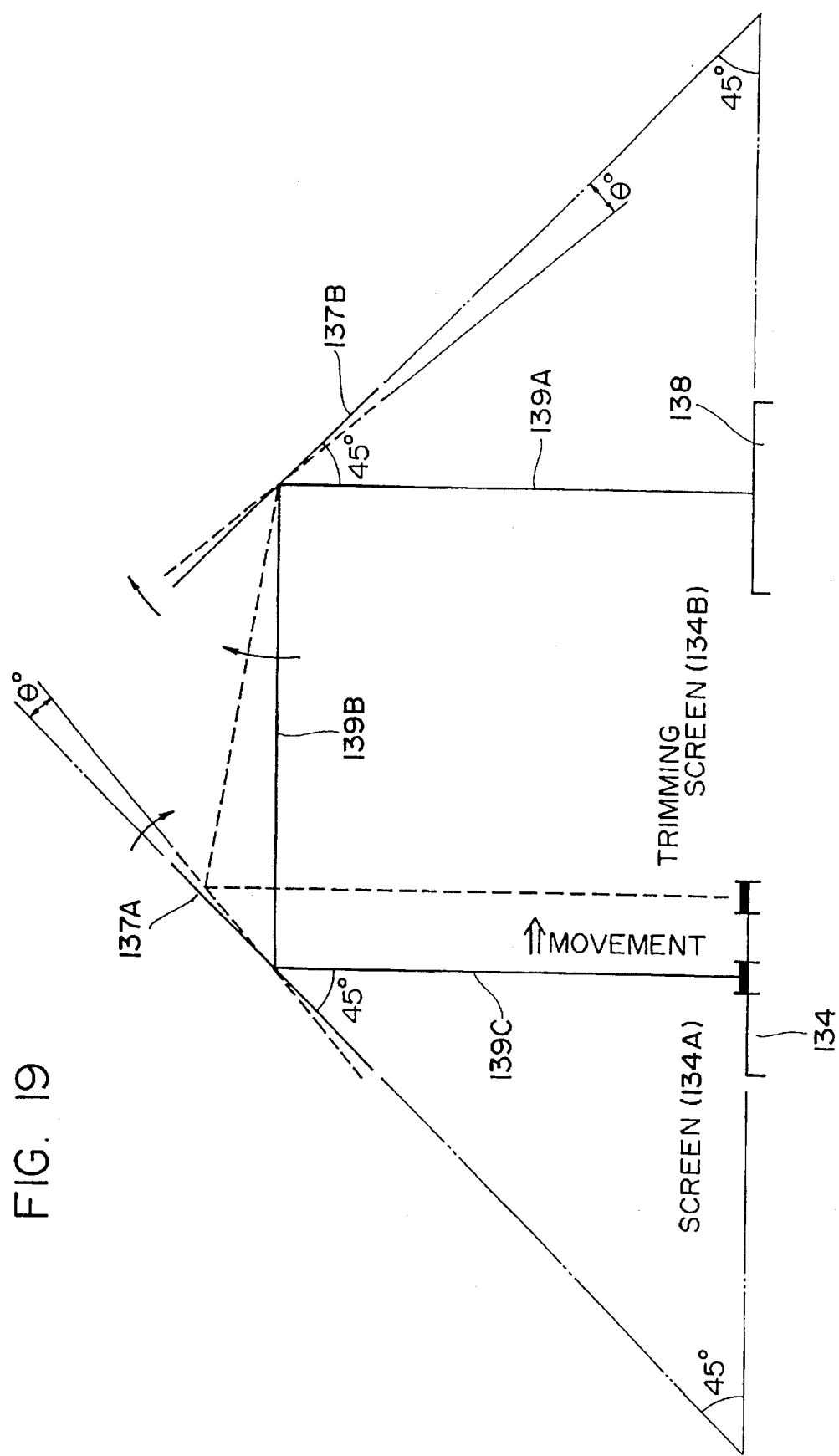
FIG. 19 is an explanatory view used to illustrate how to control a mirror when a transverse scanning operation is executed by the film image input system shown in FIG. 17.

At first, description will be given of a case in which the image is scanned in the transverse direction thereof. In this case, firstly the mirror drive mechanism 168A is driven by an instruction from the operation part 170 so that the mirror 137A is rotated about the Y1 axis, thereby rotating the mirror 137A θ° clockwise about the Y1 axis, as shown in FIG. 19. The angle of this rotation is detected by the rotation angle detector 179A and is then applied to the control circuit 177. The control circuit 177, in accordance with a signal applied thereto from the rotation angle detector 179A, controls the mirror drive mechanism 168B so that the mirror 137B can be rotated θ° clockwise about the Y2 axis.

As a result of this, the optical axis 139B is rotated clockwise about the mirror 137B in FIG. 19, and the optical axis 139B is bent by the mirror 137A to turn out an optical axis 139C which in turn intersects the surface of the film 134 at a right angle. For this reason, the monitor screen is moved from the screen 134A of the film 134 to the screen 134B thereof, so that the transverse scanning of the image can be executed. Here, the rotation angle detector 179B feeds back to the control circuit 177 a signal to indicate the angle of rotation of the mirror 137B.

Figure 20:
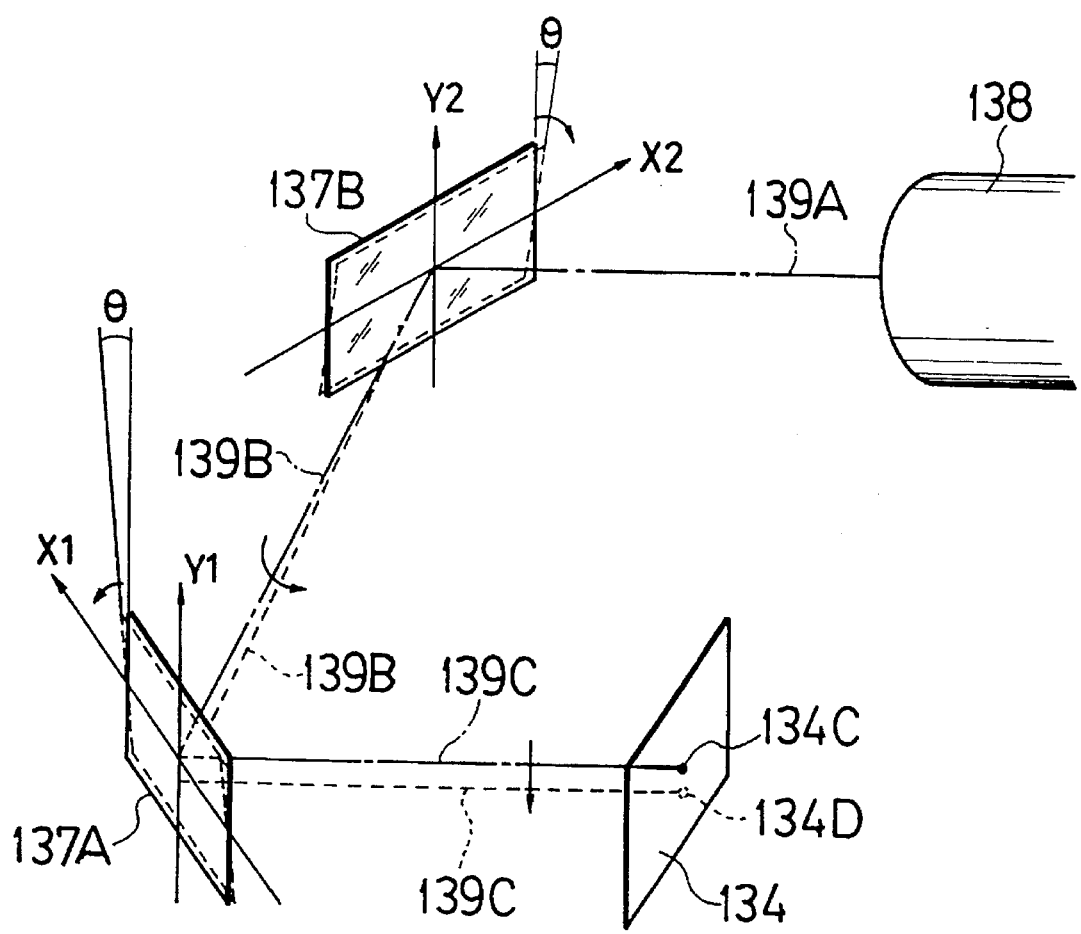
FIG. 20 is an explanatory view used to illustrate how to control a mirror when a longitudinal scanning operation is executed by the film image input system shown in FIG. 17.

Next, description will be given below of a case in which the image is scanned in the longitudinal direction thereof. In this case, firstly, the mirror drive mechanism 168A is driven by an instruction from the operation part 170 so that the mirror 137A is rotated about the X1 axis, thereby rotating the mirror 137A θ° clockwise about the X1 axis as shown in FIG. 20. The angle θ of this rotation is detected by the rotation angle detector 179A and is then applied to the control circuit 177. In accordance with a signal applied thereto from the rotation angle detector 179A, the control circuit 177 controls the mirror drive mechanism 168B so that the mirror 137B is rotated θ° about the X2 axis counter clockwise (that is, in the reverse direction as in the mirror 137A). As a result of this, the optical axis 139B is rotated about the mirror 137B downwardly in FIG. 20, that is, downwardly along the Y1 axis. The optical axis 139B is bent by the mirror 137A to turn out the optical axis 139C, which in turn intersects the surface of the film 134 at a right angle. For this reason, the monitor screen is moved from the screen 134C of the film 134 to the screen 134D thereof, thereby allowing the longitudinal scanning of the image.

As mentioned above, by rotating the mirrors 137A, 137B at a given relationship therebetween, the optical axis 139C can be made to intersect the surface of the film 134 at a right angle, so that focusing can be achieved over the whole trimming image even when the photographing magnification is great.

Figure 21:
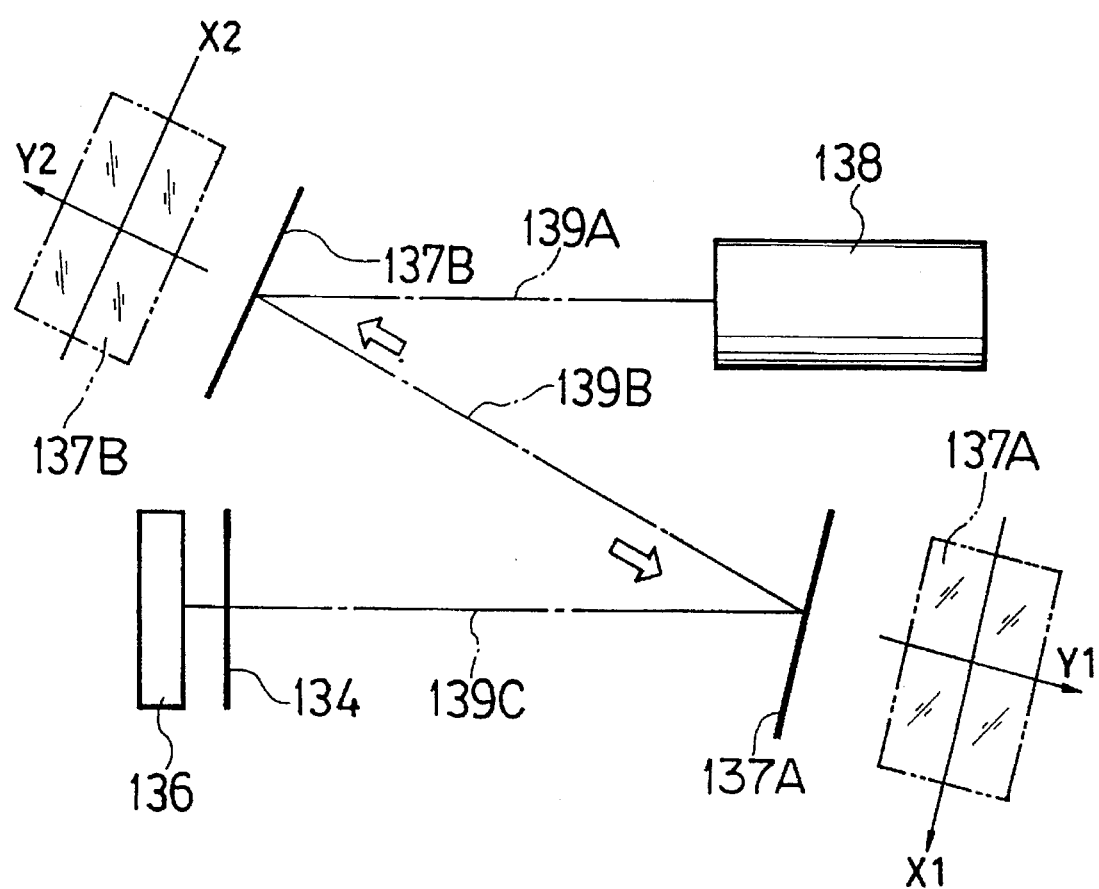
FIG. 21 is a plan view of another mirror arrangement of the film image input system shown in FIG. 17.

However, although in the above-mentioned embodiment the mirrors 137A, 137B are disposed so as to be able to bend the optical axis of the taking lens 138 substantially in an S shape, this is not limitative but, as shown in FIG. 21, the mirrors 137A, 137B may be disposed such that they can bent the optical axis of the taking lens 138 substantially in a Z shape or in an S shape. This enhances further the freedom of design of the whole system. Here, a view drawn by a two-dot chained line in FIG. 21 is an arrow view seen from the front sides of the mirrors. Also, even in this case as well, by controlling the respective mirrors similarly to the above-mentioned mirrors, the optical axis 139C can be made to intersect the surface of the film 134 at a right angle.

[Fifth Embodiment]

Figure 22:
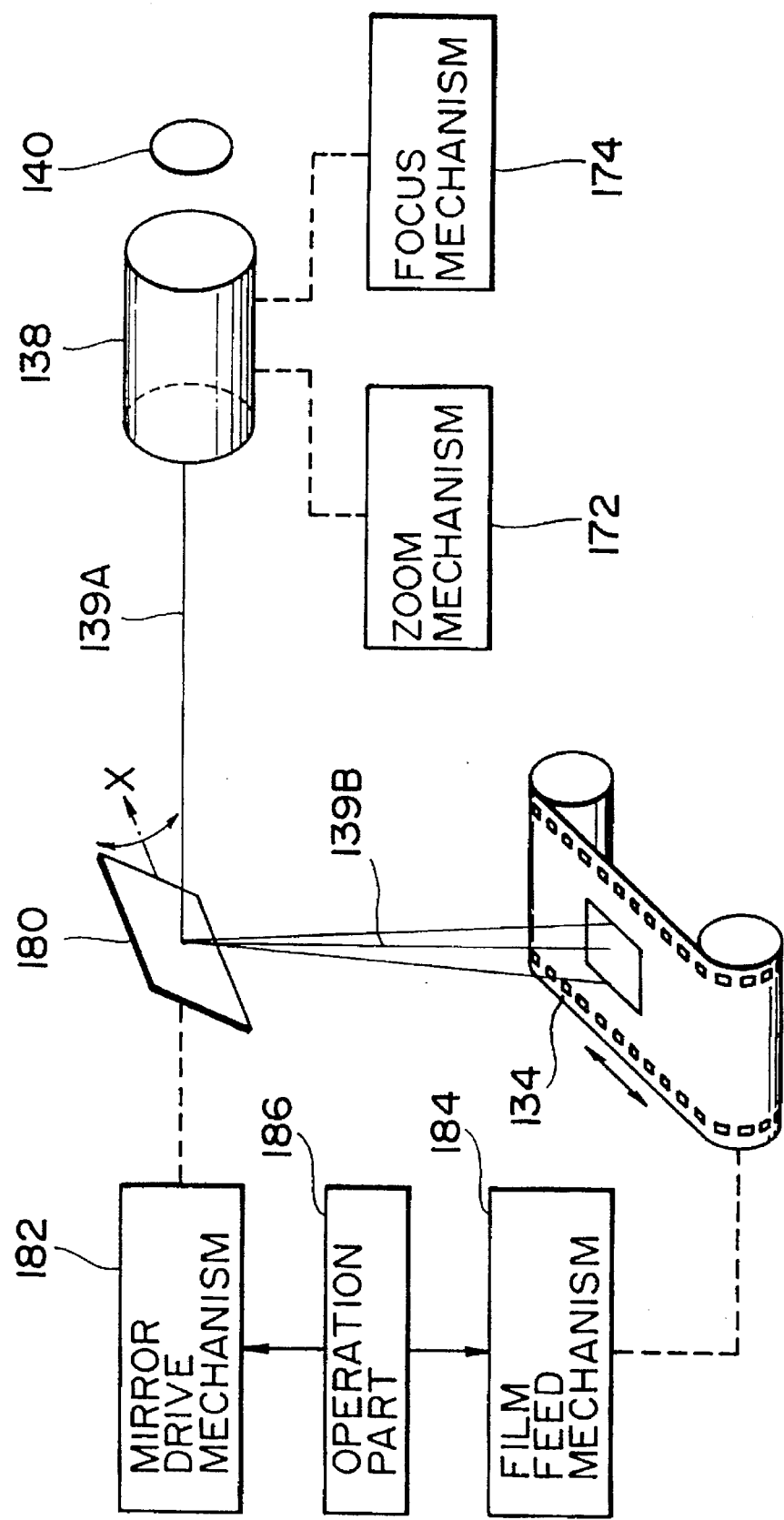
FIG. 22 is a block diagram of a fifth embodiment of a film image input system according to the invention.

Referring now to FIG. 22, there is shown a block diagram of a fifth embodiment of a film image input system according to the invention. In FIG. 22, parts used in common with the second embodiment shown in FIG. 4 are given the same designations and the detailed description thereof is omitted here.

The fifth embodiment of the present film image input system is different from the second embodiment of the present film image input system in that the scanning operation is executed by means of the rotation of the mirror 180 and by means of the feeding of the film 134, while in the second embodiment the scanning operation is executed by rotating one or two mirrors about the X and Y axes.

In other words, according the fifth embodiment, a mirror 180 is constructed such that it can be rotated only about one axis (X axis), an operation part 186 outputs to a mirror drive mechanism 182 a signal to instruct the vertical scanning of the film 134 and outputs to a film feed mechanism 184 a signal to instruct the right and left scanning of the film 134.

The mirror drive mechanism 182, in accordance with a signal applied thereto from an operation part 186, rotates the mirror 180 about the X axis, so that the optical axis 139B reflected by the mirror 180 can be made to swing in the vertical direction of the film 134.

On the other hand, a film feed mechanism 184 is able to execute the frame feeding, winding and rewinding of the film 134 and is also able to execute a scanning operation in the right and left directions of the film 134 by feeding the film 134 at low speeds.

As mentioned above, the scannings in the vertical as well as right and left directions of the film 134 can be executed by means of the rotation of the mirror 180 and by means of the feeding of the film 134. This provides an advantage that the support mechanism and drive mechanism of the mirror 180 can be constructed in a simplified manner.

Figure 23:
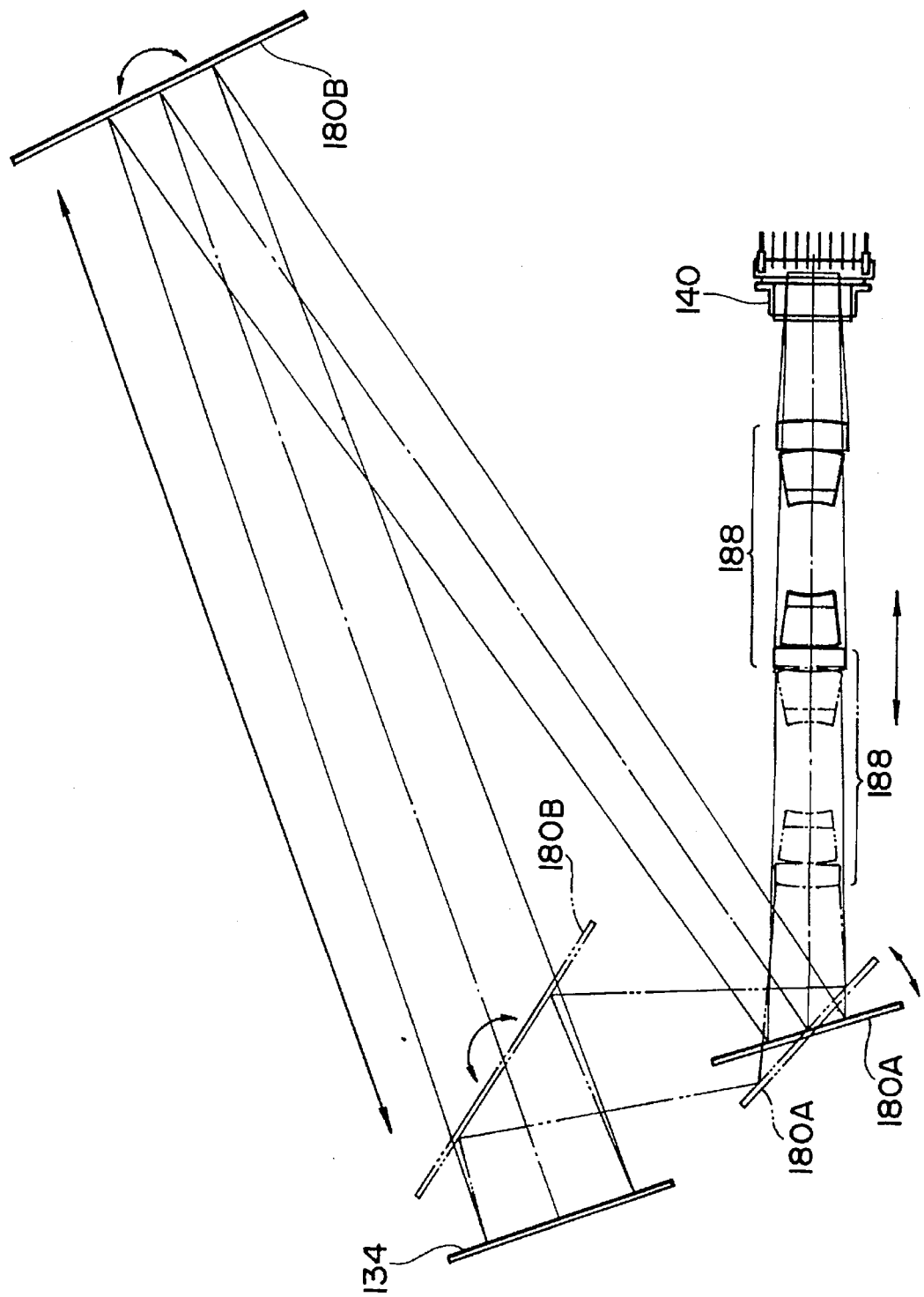
FIG. 23 is a plan view of another mirror arrangement of the film image input system shown in FIG. 22.

Here, the number of the mirror(s) is not limited to one but, as shown in FIG. 23, two mirrors 180A, 180B may be used. Also, a photographing optical system shown in FIG. 23 is constructed in such a manner that a zooming operation can be executed by moving the mirror 180 and a single focus lens 188.

That is, the optical axis of the single focus lens 188 is bent substantially in a Z shape by the two mirrors 180A, 180B. The mirror 180A is rotatably disposed, and the mirror 180B is disposed rotatably as well as movably. Also, the single focus lens 188 is disposed in such a manner that it is movable in the optical axis direction.

Also, by moving the mirror 180A, the length of the optical path extending from the film 134 to a CCD 140 can be varied. And, by rotating the two mirrors 180A, 180B at a given relationship therebetween by use of a mirror drive mechanism (not shown) according to the length of the optical path, the light of the image can be guided to the single focus lens 188. Also, the single focus lens 188 can be moved to a focusing position by means of a lens drive mechanism (not shown) according to the length of the optical path.

Here, when the two mirrors 180A, 180B and single focus lens 188 are moved to the positions shown by solid lines, then the image magnification becomes a standard magnification (for example, a magnification at which the whole of one frame of the film 134 is reproduced on the monitor TV); and, when they are moved to the positions shown by broken lines respectively, then the image magnification can be zoomed to 6 times the above-mentioned standard magnification. Also, although in the above mentioned embodiment the optical axis of the single focus lens 188 is bent substantially in a Z shape by the two mirrors 180A, 180B, the optical axis may be bent substantially in a U shape. However, when the optical axis of the single focus lens 188 is bent substantially in a Z shape by use of the two mirrors 180A, 180B, it is advantageous to execute a zooming operation by moving one of the mirrors and only a small space is required. Also, when the optical axis of the single focus lens 188 is bent substantially in a U shape, the film, CCD and other parts can be arranged in a different manner from the case in which the optical axis is bent substantially in a Z shape.

[Sixth Embodiment]

Figure 24:
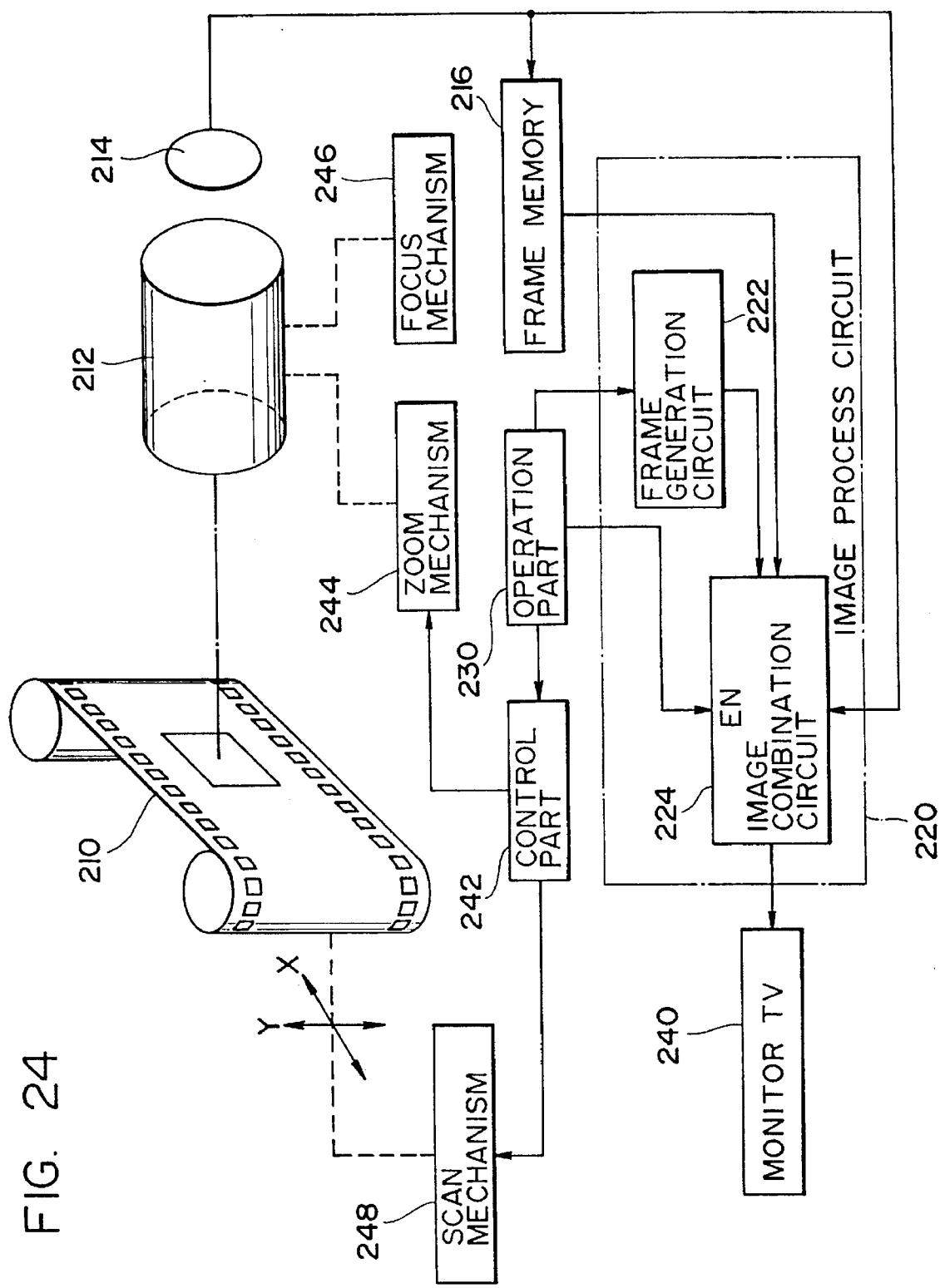
FIG. 24 is a block diagram of a sixth embodiment of a film image input system according to the invention.

Referring now to FIG. 24, there is shown a block diagram of a sixth embodiment of a film image input system according to the present invention. As shown in FIG. 24, in the present film image input system, an image on a developed film 210 is picked up by an image pickup device including a taking lens 212 and a CCD 214, and an image signal to indicate the pickup image is output to a frame memory 216 and an image process circuit 220. The image process circuit 220 executes an image processing to be discussed later, generates a given image signal, and outputs the image signal to the monitor TV 240. As a result of this, the image of the film 210 is displayed in the monitor TV 240. Here, it should be noted that, when the film 210 is a negative film, an image processing to execute a negative/positive inversion is also performed in the image process circuit 220.

Figure 25:
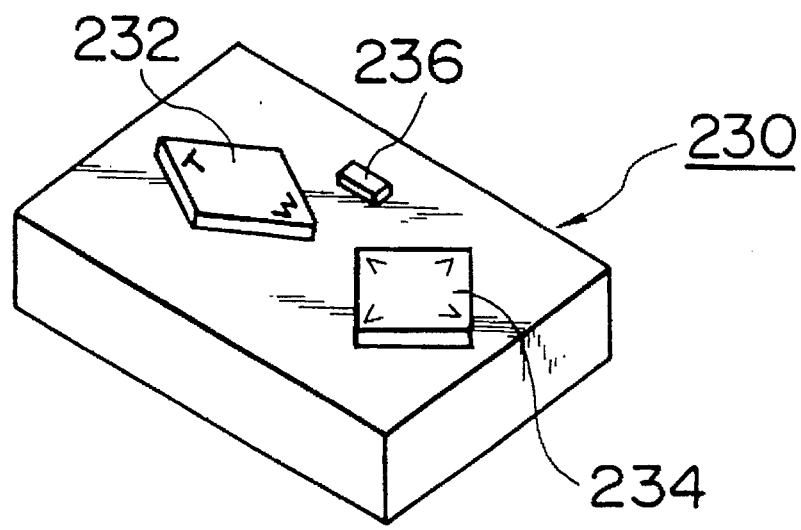
FIG. 25 is a perspective view of details of an operation part of the film image input system shown in FIG. 24.

In the operation part 230, as shown in FIG. 25, there are provided a zoom switch 232, a scan switch 234 and a screen switching switch 236. And, responsive to the switching operations of the zoom switch 232 and scan switch 234, a zoom signal and a scan signal are applied to a control circuit 242 and to a frame generation circuit 222 with the image process circuit 220 and, if the screen switching switch 236 is turned on, then an enable signal is applied to an image combination circuit 224 within the image process circuit 220.

On inputting a zoom signal from the operation part 230, the control circuit 242 controls a zoom mechanism 244 in accordance with the zoom signal to thereby zoom the taking lens 212 as well as to zoom in and out the film image. Also, a focus mechanism 246 is used to focus the taking lens 212.

Also, on inputting a scan signal from the operation part 230, the control circuit 242 controls a scan mechanism 248 in accordance with the scan signal to thereby scan the film image in the vertical direction as well as in the right and left direction thereof.

Here, the movement of the film 210 in the right and left direction (X direction) is enforced by winding or rewinding the film 210, while the frame feeding of the film 210 is achieved by feeding the film 210 by a given amount in the X direction. Also, the scanning of the film image in the upward and downward (vertical) direction as well as in the right and left direction can also be executed by moving the taking lens 212. Further, the CCD 214 can be rotated ±90° by a CCD rotating mechanism (not shown), which enables the present system to be applied to a case where the film image is picked up longitudinally in the film 210.

The frame memory 216 is a memory which stores an image signal for one frame and outputs the image signal to the image combination circuit 224. The frame memory 216 updates its memory content each time one frame of the film 210 is fed. Here, when one frame of the film 210 is fed, the taking lens 212 is limited to a standard magnification previously set (for example, a magnification at which a film image of the whole of one frame is placed into the entire screen of the monitor TV 240) and, for this reason, an image signal output from the frame memory 216 provides an image signal to indicate the film image of the whole of one frame.

The frame generation circuit 222, in accordance with the zoom signal and scan signal input thereto from the operation part 230, generates a frame signal to indicate a trimming frame 241 having a size and a position corresponding to the zoom and scan signals and then applies the frame signal to the image combination circuit 224.

The image combination circuit 224 is disabled when a screen switching switch 236 of the operation part 230 is off and, when image signals are input sequentially from the CCD 214, outputs the image signals to the monitor TV 240 as they are. As a result of this, the film image being currently photographed is displayed over the entire screen of the monitor TV 240. On the other hand, the image combination circuit 224 is enabled when the screen switching switch 236 is turned on and an enable signal is applied thereto, and performs the following image processings.

Figure 26:
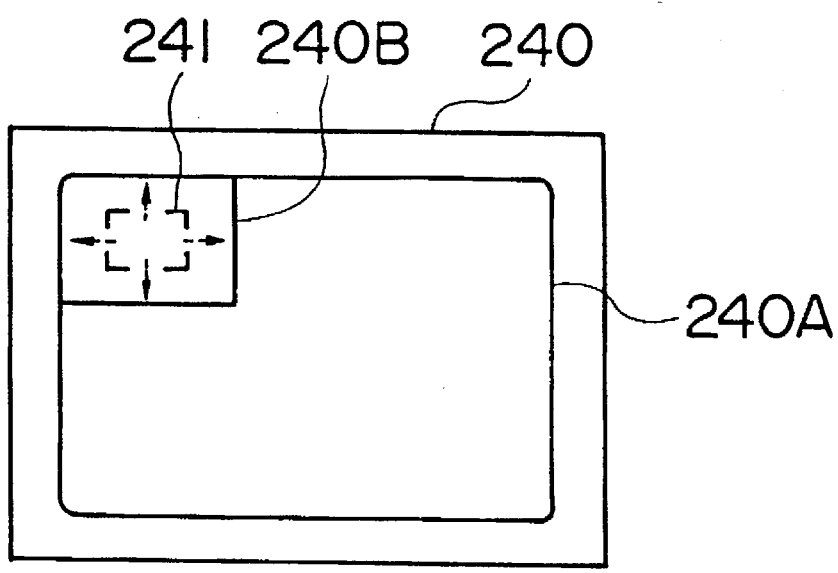
FIG. 26 is a view of an example of display in a monitor TV employed in the film image input system shown in FIG. 24.

In other words, as shown in FIG. 26, the image combination circuit 224 generates an image signal which allows display of an image consisting of a screen 240A of the monitor TV 240 and a small screen 240B combined therein. Here, to generate the image signal of the image within the Small screen 240B, an image signal may be generated which consists of the image of the whole of one frame and a trimming frame 241 combined therewith in accordance with an image signal applied from the frame memory 216 and in accordance with a frame signal applied from the frame generation circuit 222, and the thus generated image signal may be then compressed. And, the image signal of the above-mentioned small screen 240B and a current image signal sequentially input from the CCD 214 are switched to thereby create an image signal of an image including the small screen 240B combined into a given position of the screen 240A.

Due to the fact that the frame generation circuit 222 outputs to the image combination circuit 224 a frame signal corresponding to a trimming operation in the operation part 230 (a zoom signal output from the zoom switch 232 and a scan signal output from a scan switch 234), the trimming frame 241, if the zoom switch 232 is operated, is varied in size within the small screen 240B and, if the scan switch 234 is operated, it is moved within the small screen 240B. Due to this, a desired trimming operation can be performed while observing the trimming frame 241 within the small screen 240B.

Figure 27:
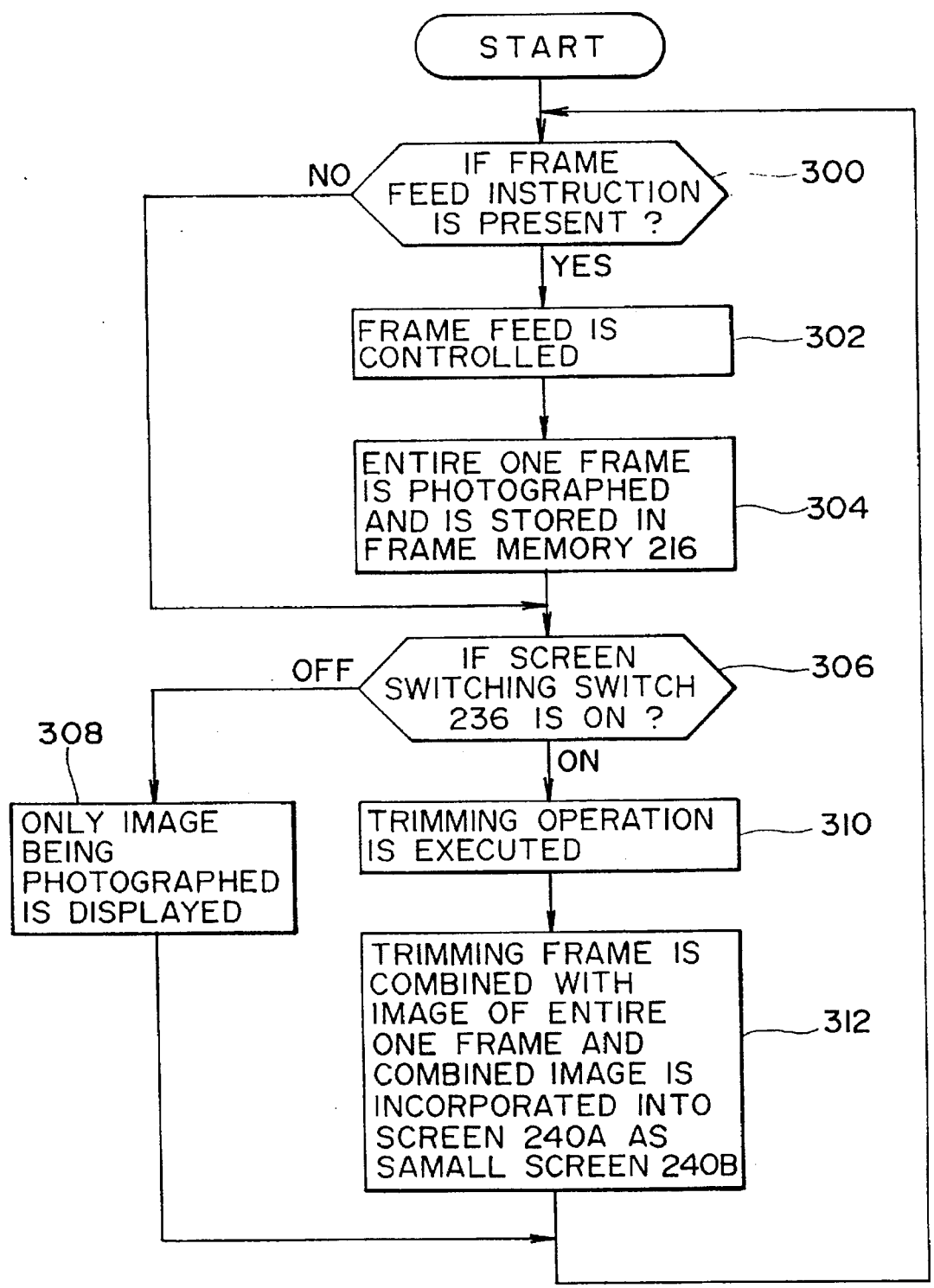
FIG. 27 is a flow chart used to explain the operation of the film image input system shown in FIG. 24.

Next, description will be given below of the operation of the above-mentioned film image input system with reference to a flow chart shown in FIG. 27.

At first, if a frame feeding instruction is output from a frame feeding button (not shown) of the operation part 230 (Step 300), then the frame feeding of the film 210 is controlled (Step 302). In the frame feeding, the taking lens 212 picks up the film image at a previously set standard magnification, thereby allowing the frame memory 216 to store an image signal for one frame (Step 304).

Next, it is checked whether the screen switching switch 236 is turned on or not (Step 306). When the screen switching switch 236 is off, then the program advances to Step 308, in which only the film image being currently picked up is displayed on the whole screen of the monitor TV 240 and after then the program returns back to Step 300.

On the other hand, if the screen switching switch 236 is off, then the program advances to Steps 310 and 312. And, if a trimming operation using the zoom switch 232 and scan switch 234 is performed (Step 310), then a trimming frame corresponding to the trimming operation is created and the trimming frame is combined into the screen 240A as a small screen 240B, and after then the program returns back to Step 300 (Step 312). As a result of this, the image being currently picked up within the trimming frame is displayed in the screen 240A, and the image of the whole of one frame and the trimming frame 241 are displayed in the small screen 240B (see FIGS. 26 and 28).

Figure 28:
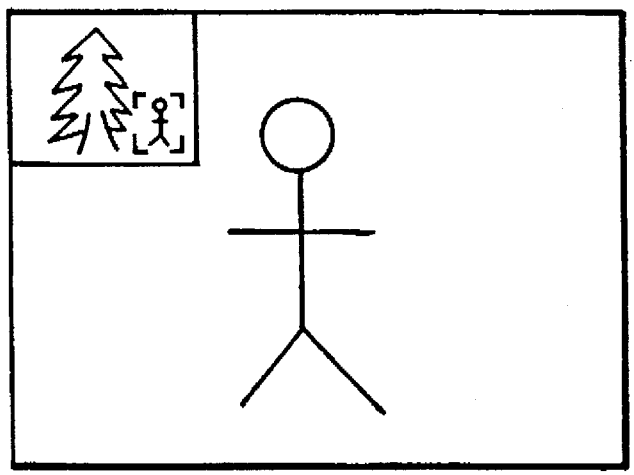
FIG. 28 is a view of an example of display in the monitor TV employed in the film image input system shown in FIG. 24.
Figure 29:
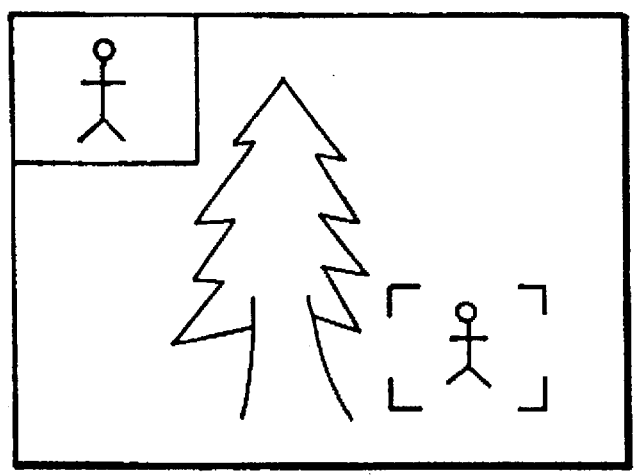
FIG. 29 is a view of another example of display in the monitor TV employed in the film image input system shown in FIG. 24.

And, if a frame instruction is absent (Step 300) and the screen switching switch 236 is turned on, then a monitor display is made according to the trimming operation- Also, is the frame is fed by the frame feeding instruction, then the storage content of the frame memory 216 is updated to an image signal of a new film image, so that a trimming operation of the new film image can be performed similarly to the above-mentioned case Although in the present embodiment, as shown in FIG. 28, the image of the whole of one frame and the trimming frame are displayed in the small screen and the image being currently picked up is displayed in the portions of the screen other than the small screen, this is not limitative but, as shown in FIG. 29, the image of the whole of one frame and the trimming frame may be displayed in the portions of the screen other than the small screen and the image being currently picked up within the trimming frame may be displayed in the small screen- Also, there may be provided screen switching means which switches the screen shown in FIG. 28 and the screen shown in FIG. 29.

[Seventh Embodiment]

Figure 30:
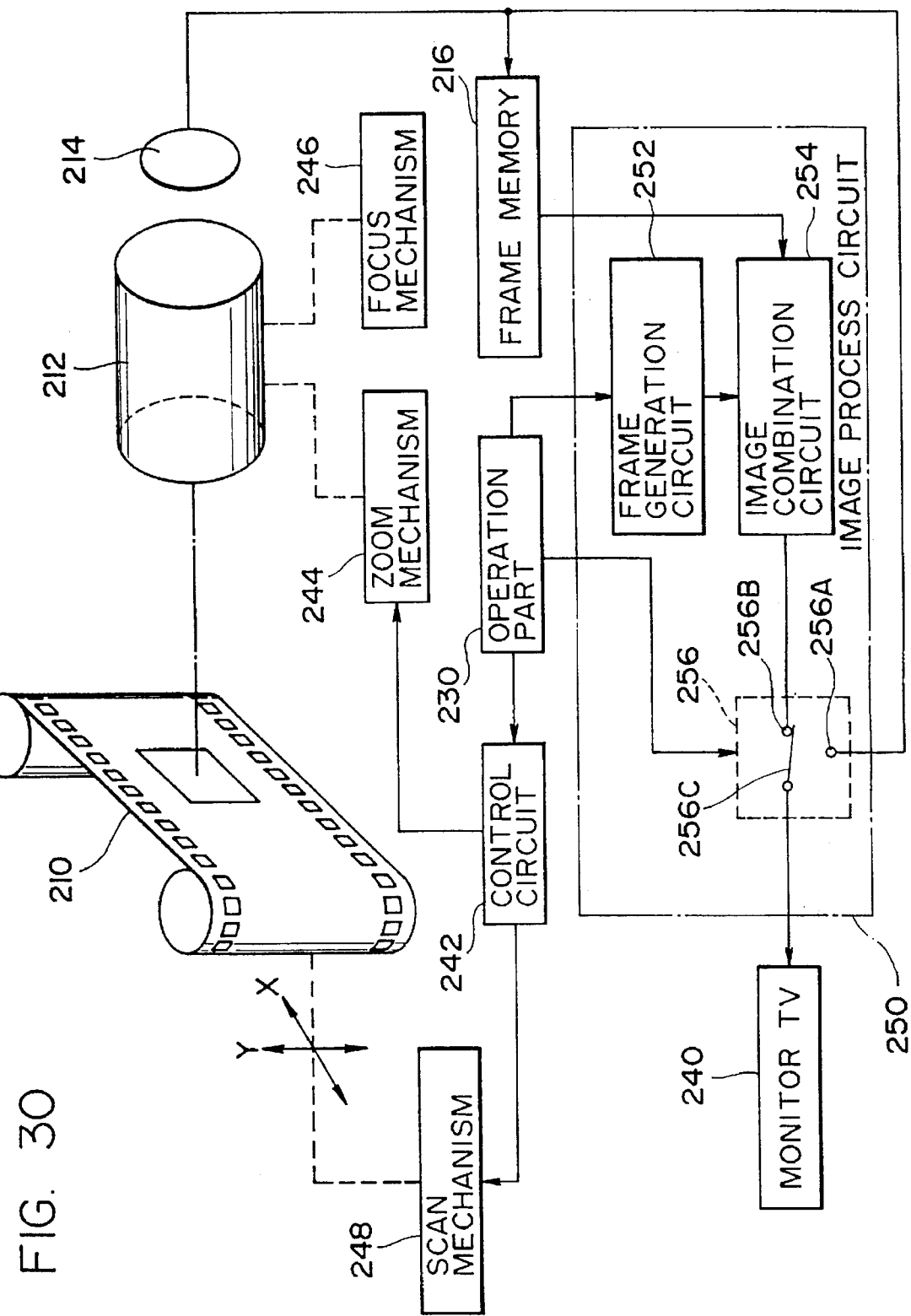
FIG. 30 is a block diagram of a seventh embodiment of a film image input system according to the invention.

Referring now to FIG. 30, there is shown a block diagram of a seventh embodiment of a film image input system according to the present invention. In FIG. 30, parts used in common with the film image input system shown in FIG. 24 are given the same designations and the detailed description thereof is omitted here.

Figure 31A:
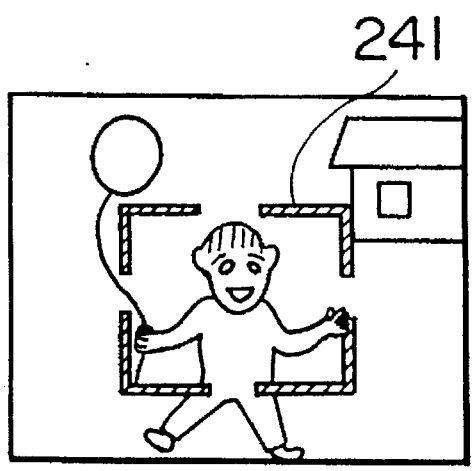
FIGS. 31 (A) and (B) are respectively views of examples of display in a monitor TV employed in the film image input system shown in FIG. 30.
Figure 31B:
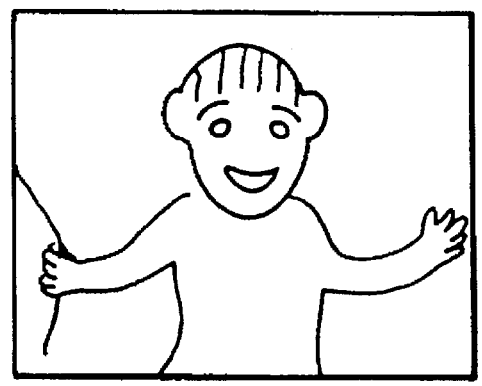

In accordance with the zoom signal and scan signal input from the operation part 230, the frame generation circuit 252 generates a frame signal to indicate a trimming frame 241 (see FIG. 31 (A)) having a size and a position corresponding to the input zoom and scan signals, and then outputs the frame signal to an image combination circuit 254.

The image combination circuit 254, in accordance with the image signal applied from the frame memory 216 and the frame signal applied from the frame generation circuit 252, as shown in FIG. 31 (A), creates an image signal consisting of the image of the whole of one frame and the trimming frame 241 combined therewith, and outputs the thus created image signal to a contact 256B of a switching switch 256. Also, to the other contact 256A of the switching switch 256 is being applied from a CCD 214 an image signal which indicates the film image being currently picked up.

Now, if the screen switching switch 236 is turned off and a movable contact 256C of the switching switch 256 is connected to the contact 256B, then the image signal created by the image combination circuit 254 is applied to the monitor TV 240 and, as shown in FIG. 31 (A), an image consisting of the image of the whole of one frame and the trimming frame 241 combined therewith is displayed. Due to the fact that the frame generation circuit 252 outputs to the image combination circuit 254 a frame signal corresponding to a trimming operation (that is, a zoom signal output from a zoom switch 232 and a scan signal output from a scan switch 234) in the operation part 230, the trimming frame 241 is varied in size within the screen of the monitor TV 240 if the zoom switch 232 is operated, and is moved within the screen if the scan switch 234 is operated. By means of this, a desired trimming operation can be executed while observing the trimming frame 241 within the screen of the monitor TV 240.

On the other hand, in the above-mentioned display state, if the screen switching switch 236 is turned on and the movable contact 256C of the switching switch 256 is connected to the contact 256A, then an image signal from the CCD 214 is applied to the monitor TV 240 and, as shown in FIG. 31 (B), the image being currently picked up within the trimming frame 241 is displayed.

[Eighth Embodiment]

Figure 32:
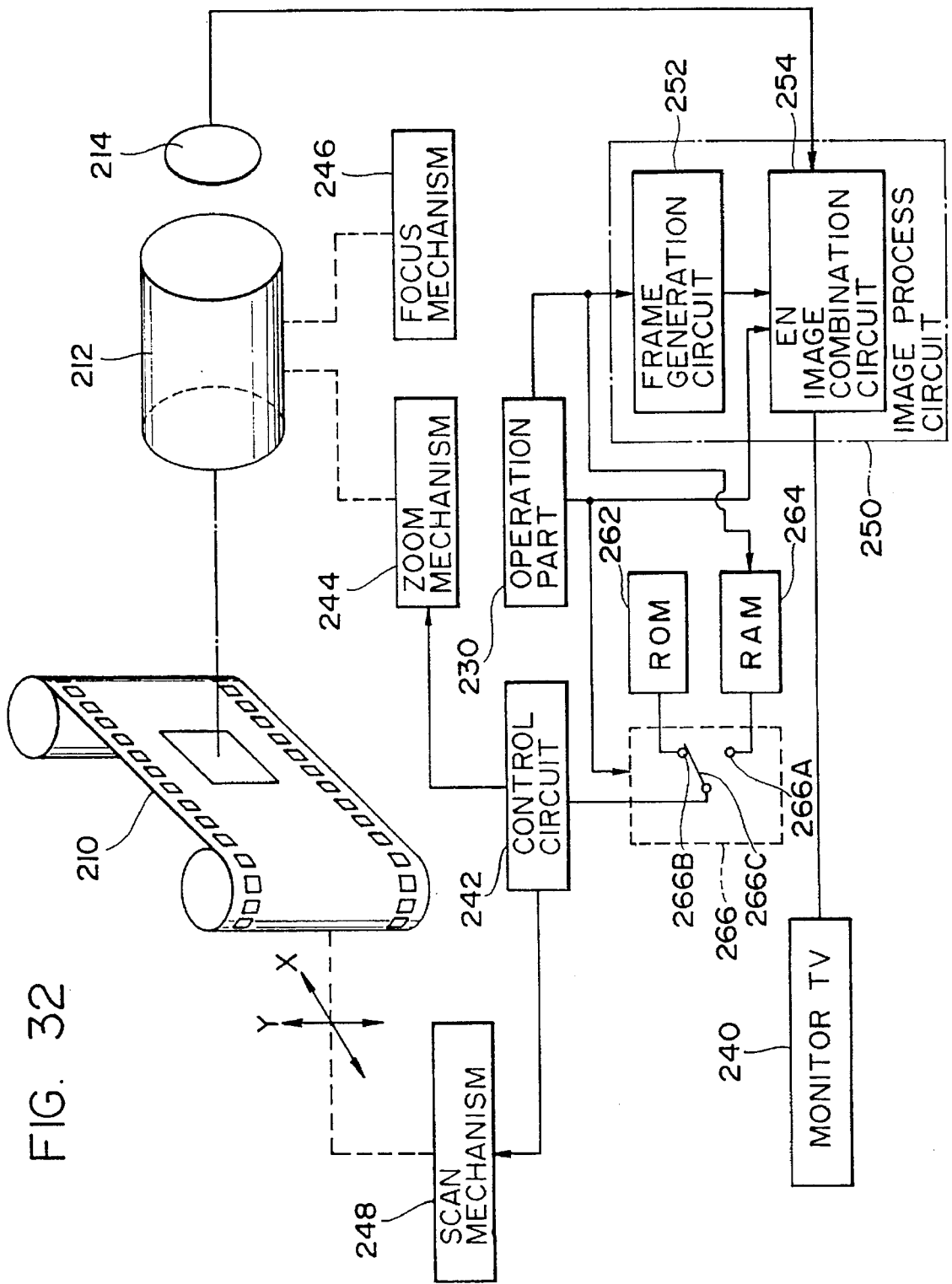
FIG. 32 is a block diagram of an eighth embodiment of a film image input system according to the invention.

Referring now to FIG. 32, there is shown a block diagram of an eighth embodiment of a film image input system according to the present invention. In FIG. 32, parts used in common with the seventh embodiment shown in FIG. 30 are given the same designations and the detailed description thereof is omitted here.

The film image input system shown in FIG. 32 is different from the film image input system shown in FIG. 30 in that, in place of the frame memory 216 and switching switch 256 shown in FIG. 30, there are provided a ROM 262, a RAM 264 and a switching switch 266.

In ROM 262, there are previously stored a zoom signal to indicate a standard magnification and a scan signal to indicate a standard position. On the other hand, in RAM 264, there are stored the latest zoom signal and scan signal which are applied from the operation part 230. Also, in the switching switch 266, if the screen switching switch 236 of the operation part 230 is turned on/off, then the movable contact 266C thereof is switched to the contact 266A or to the contact 266B and further the image combination circuit 254 is enabled only when the switching switch 266 is turned off.

Next, description will be given below of the operation of the above-mentioned film image input system.

At first, if the screen switching switch 236 is turned off, then the movable contact 266C of the switching switch 266 is switched to the contact 266B, so that the zoom signal to indicate the standard magnification and the scan signal to indicate the standard position respectively stored in ROM 262 are applied to the control circuit 242 and at the same time an enable signal is applied to the image combination circuit 254 to thereby enable the image combination circuit 254. Accordingly, the control circuit 242 controls the zoom mechanism 244 to execute a zooming operation such that the taking lens 212 provides the standard magnification and also controls the scan mechanism 248 to execute a scanning operation of the film image in the upward and downward direction as well as in the right and left direction thereof such that the scan position provides the standard position. As a result of this, an image signal to indicate the film image of the whole of one frame is applied from the CCD 214 to the image combination circuit 254.

Here, if the zoom switch 232 and scan switch 234 of the operation part 230 are operated, then a zoom signal and a scan signal respectively corresponding to the operations of these switches are stored in RAM 264 and at the same time a frame signal corresponding to these operations is applied from the frame generation circuit 252 to the image combination circuit 254, in which image combination circuit 254 the image signal of the whole of one frame is combined with the frame signal. As a result of this, a combined image of the image of the whole of one frame and the trimming frame 41 is displayed on the screen of the monitor TV 240, as shown in FIG. 31 (A).

On the other hand, to display on the monitor TV 240 only the image within the trimming frame that is trimmed in the above-mentioned manner, the screen switching switch 236 is turned on, so that the movable contact 266C of the switching switch 266 is changed over to the contact 266A and at the same time the image combination circuit 254 is disabled. By means of this, a zoom signal and a scan signal respectively corresponding to the above-mentioned trimming frame are applied from RAM 264 to the control circuit 242 and the zoom mechanism 244 and scan mechanism 248 are controlled in accordance with these zoom and scan signals. As a result of this, only the film image within the above-mentioned trimming frame is picked up and an image signal to indicate the film image is output through the image combination circuit 254 to the monitor TV 240.

[Ninth Embodiment]

Figure 33:
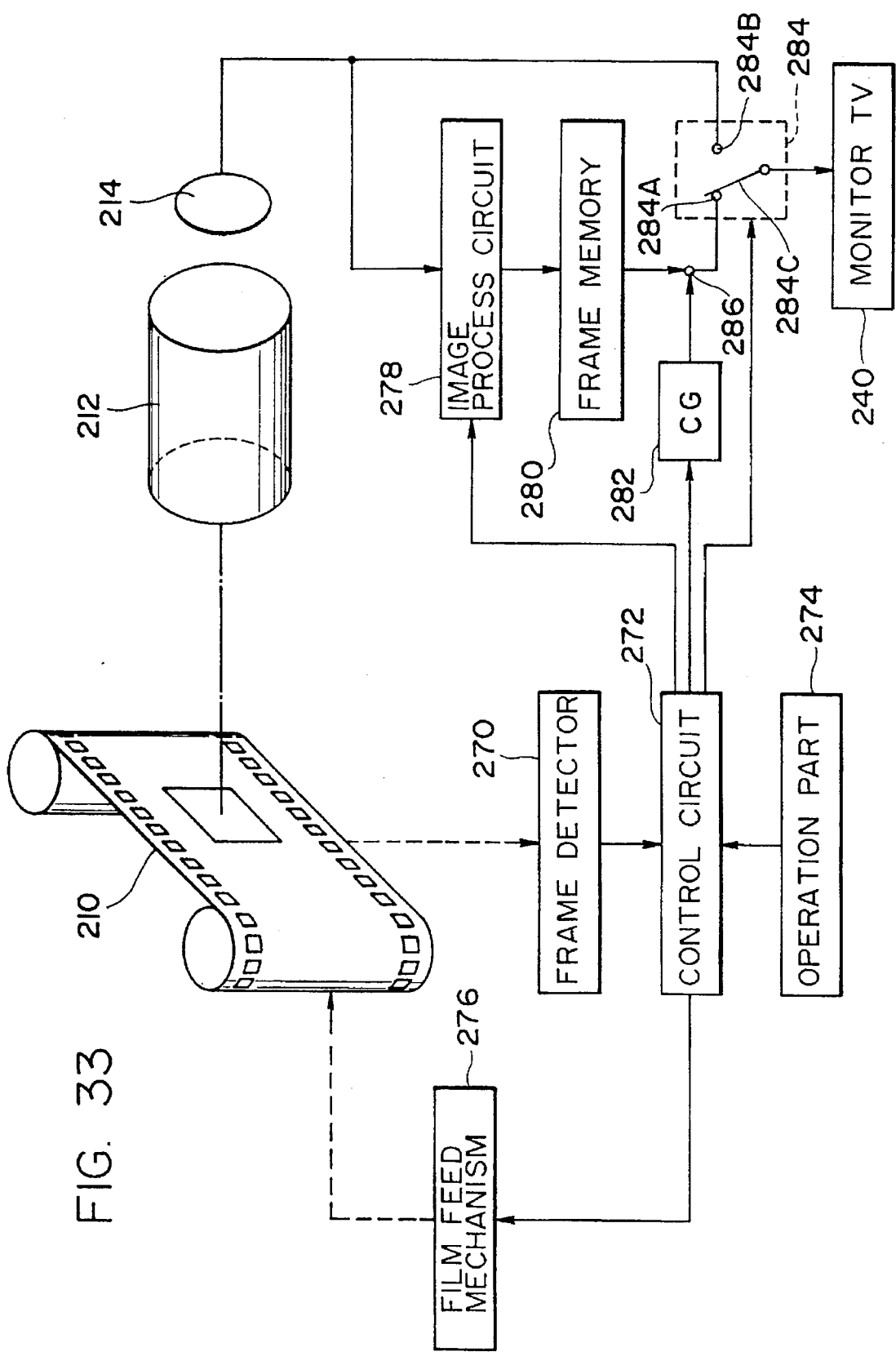
FIG. 33 is a block diagram of a ninth embodiment of a film image input system according to the invention.

Referring now to FIG. 33, there is shown a block diagram of a ninth embodiment of a film image input system according to the present invention. In FIG. 33, parts used in common with the film image input system are given the same designations and the detailed description thereof is omitted here.

The present film image input system mainly consists of an image pickup device including a taking lens 212 and a CCD 214 to pick up an image on a developed film 210 and output an image signal, a frame detector 270, a control circuit 272, an operation part 274, a film feed mechanism 276, an image process circuit 278, a frame memory 280, and a switching switch 284.

Figure 34:
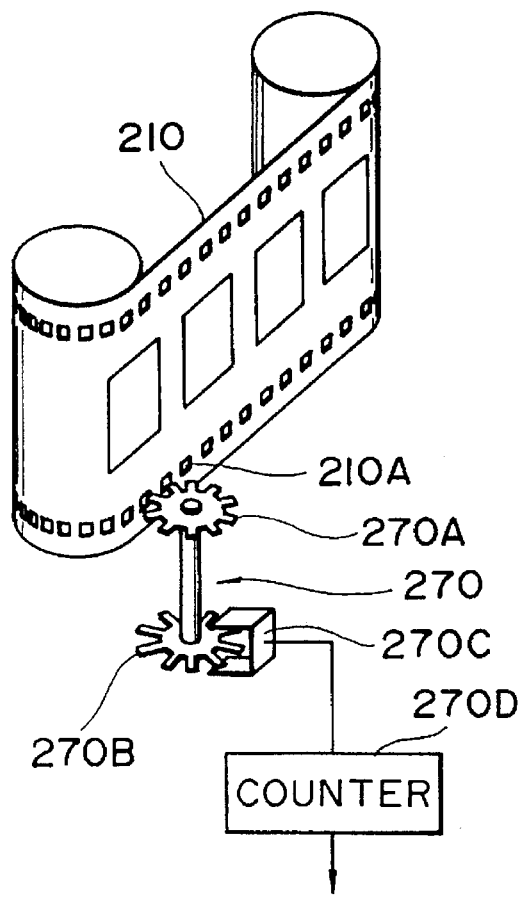
FIG. 34 is a view of details of a frame detector employed in the film image input system shown in FIG. 33.

The frame detector 270 outputs a frame detect signal to the control circuit 272 each time one frame of the film 210 is fed. The frame detector 270, as shown in FIG. 34, mainly consists of a sprocket 270A engageable with a perforation 210A of the film 210, a disc 270B including the same number of blades as the number of teeth of the sprocket 270A to be rotatable together with the sprockets 270A, a photo interrupter 270C for detecting the blades of the disc 270B, and a counter 270D for counting the number of detect signals (pulse signals) applied from the photo interrupter 270C. The counter 270D, each time when the count value thereof reaches the number of perforations for one frame of the film 210, outputs a frame detect signal to the control circuit 272.

Figure 36:
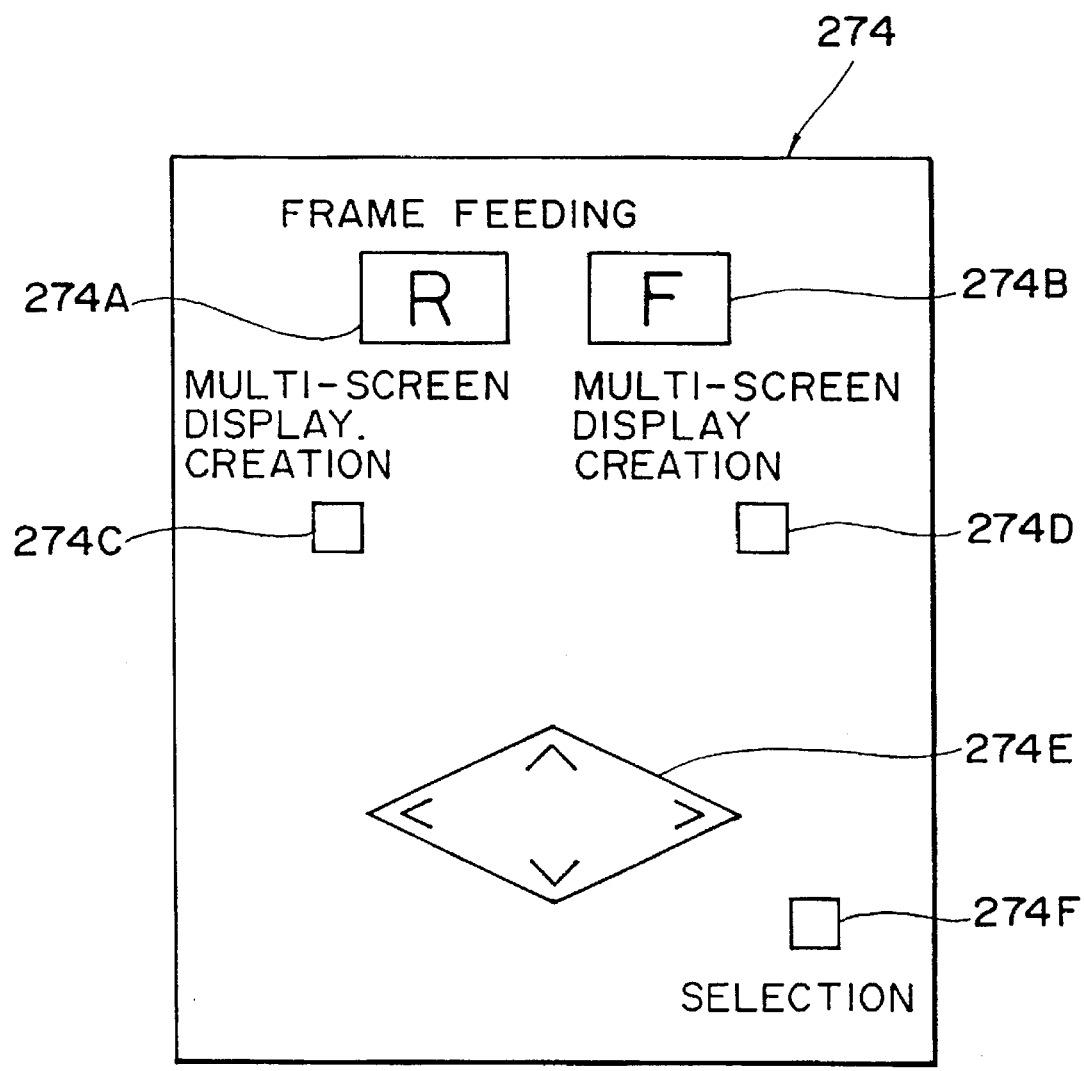
FIG. 36 is a view of details of an operation part employed in the film image input system shown in FIG. 33.

The operation part 274, as shown in FIG. 36, includes frame feed buttons 274A and 274B which are respectively used to feed the frames of the film 210 one by one in the forward and reverse directions, a multi-screen forming button 274C, a multi-screen display button 274D, a select mark moving button 274E, and a select button 274F. The operation part 274 outputs to the control circuit 272 signals according to the button operations of these buttons.

The control circuit 272, responsive to the various signals applied thereto from the operation part 274, controls a film feed mechanism 276, an image process circuit 278, a character generator 282 and a switching switch 284, as will be discussed later. Also, the control circuit 272 has a function to count the number of the frame detect signals applied from the frame detector 270 and detect the number of the frame being currently picked up.

Figure 35:
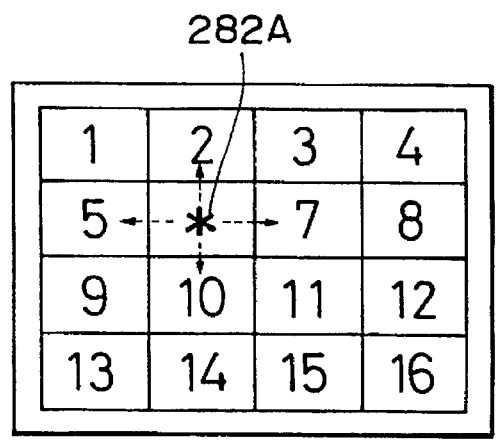
FIG. 35 is a view of an example of a multi-screen to be displayed by a monitor TV employed in the film image input system shown in FIG. 33.

The image process circuit 278 becomes operable if a signal to indicate the formation of the multi-screen is applied thereto from the control circuit 272 and, for this reason, as shown in FIG. 35, the image process circuit 278 compresses an image signal input from the CCD 214 in order to form one of 16 small screens constituting the multi-screen and then stores the compressed image signal in a given storage portion of the frame memory 280 corresponding to the current frame number. The frame memory 280 has 16 storage portions and stores the image signals of the respective frames;compressed in the respective storage portions. That is, the image signals of the multi-screen are to be stored in the frame memory 280.

The character generator 282, as shown in FIG. 35, is used to output to an addition point 286 a character signal to indicate a select mark 282A in order for the select mark 282A to be superimposed on the multi-screen. To the character generator 282 is applied from the control circuit 272 a signal which indicates the number of the frame selected according to the operation of the select mark moving button 274E. And, the character generator 282, in accordance with the signal indicating the frame number input in the above-mentioned manner, outputs a character signal to the addition point 286 at a timing corresponding to the position of the frame selected.

The switching switch 284, if the movable contact piece 284C thereof is switched over to the contact 284A, outputs to the monitor TV 240 the image signal of the multi-screen applied from the frame memory 280 and the character signal applied from the character generator 282, while the switching switch 284 outputs to the monitor TV 240 the image signal applied from the CCD 214 if the movable contact piece 284C is switched over to the contact 284B.

Figure 37:
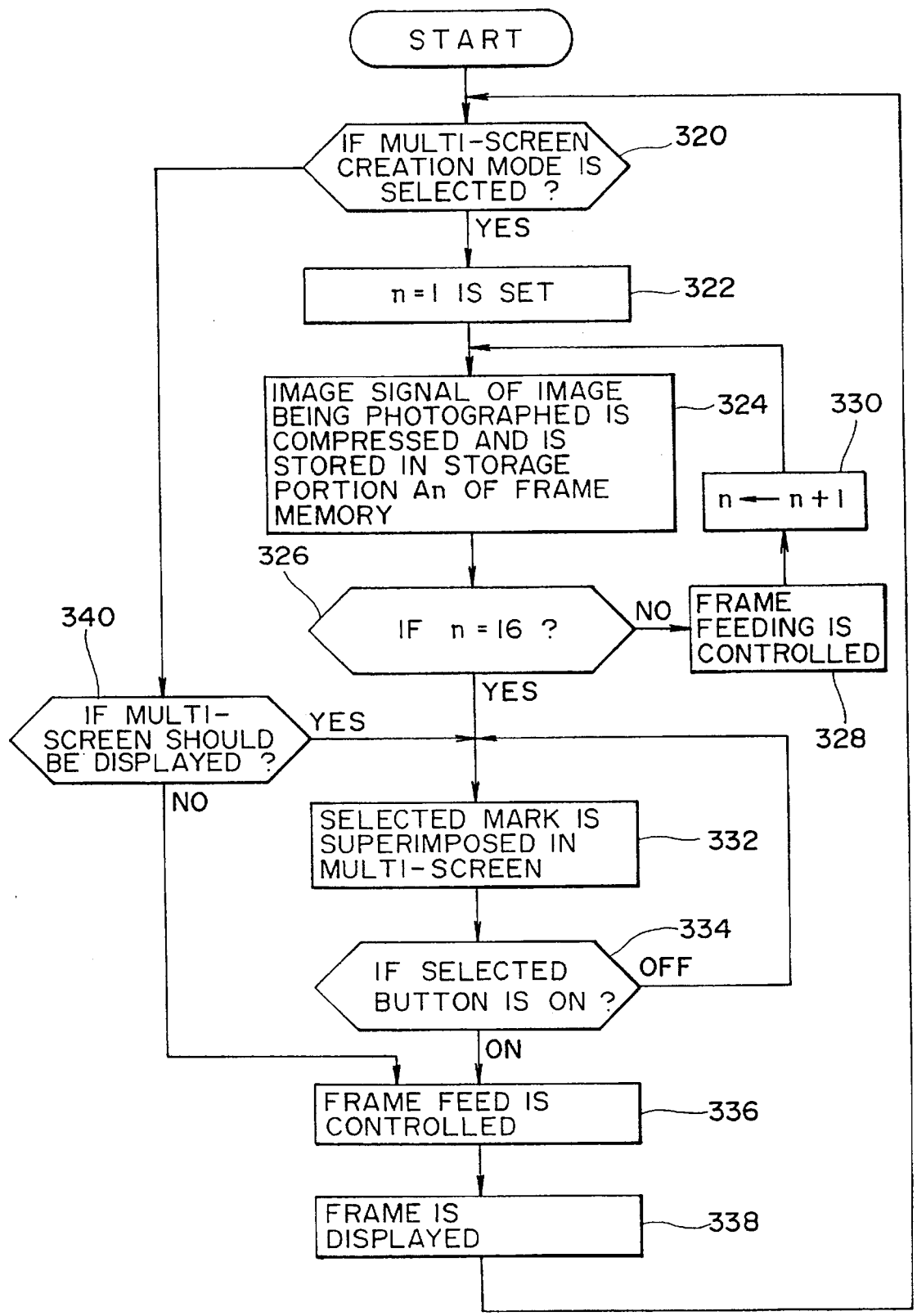
FIG. 37 is a flow chart used to illustrate the operation of the film image input system shown in FIG. 33.

Next, description will be given below of the operation of the above-constructed film image input system with reference to a flow chart shown in FIG. 37.

At first, the control circuit 272 checks from the operation state of the multi-screen forming button 274C whether a multi-screen forming mode is set or not (Step 320). Here, if the multi-screen forming button 274C is pushed once and the multi-screen forming mode is set, then the control circuit 272 sets the frame number n for 1 (Step 322), compresses the image signal of the film image being currently picked up by means of the image process circuit 278, and then allows the compressed image signal to be stored in the storage portion $A_n$ (n=1) of the frame memory 280 (Step 324).

Next, it is checked whether the frame number n has reached 16 or not (Step 326). If the frame number n is found smaller than 16, then the film feed mechanism 276 is controlled until the frame detect signal is applied from the frame detector 270 to thereby move the film 210 to thereby feed one frame (Step 328), the frame number n is incremented by 1 (Step 330), and after then the program returns back to Step 324. And, until the frame number n reaches 16, that is, until the image signals are stored in all of the storage portions $A_n$ of the frame memory 280, the processings from Step 324 to Step 330 are executed repeatedly.

If the image signal corresponding to the multi-screen is stored in the frame memory 280 in the above-mentioned manner, then the thus stored image signal and the character signal applied from the character generator 282 are output through the switching switch 284 to the monitor TV 240 and, as shown in FIG. 35, the select mark 282A is superimposed on the multi-screen for display (Step 332). In this state, if the select mark moving button 274E is operated, then the select mark 282A is moved on the multi-screen responsive to the operation of the button 274E and at the same time the number of the frame in which the select mark 282A is being displayed is stored in the control circuit 272.

Here, if the select button 274F is turned on (Step 334), then the frame in which the select mark 282A is being displayed is selected, and the control circuit 272 controls the film feed mechanism 276 in order that the selected frame is to be photographed (Step 336), and also switches the movable contact piece 284C of the switching switch 284 to the contact 284B to thereby output to the monitor TV 240 the image signal of the selected frame, so that the selected frame can be displayed on the entire screen (Step 338).

On the other hand, when the multi-screen forming button 274C is not pushed once in Step 320, then the program advances to Step 340, in which step it is checked whether the multi-screen should be displayed or not. In other words, if the multi-screen display button 274D is pushed once, then the program advances to Step 332, in which the movable contact piece 284C of the switching switch 284 is switched to the contact 284A to display the multi-screen again and a frame selection is executed similarly to the above-mentioned case. Also, if the multi-screen display button 274D is not pushed once, then the program advances to Step 336, in which by operating the frame feed button 274A or 274B the film 210 is frame fed frame by frame in a forward or reverse direction, thereby making it possible to select a frame to be displayed on the entire screen.

[Tenth Embodiment]

Figure 38:
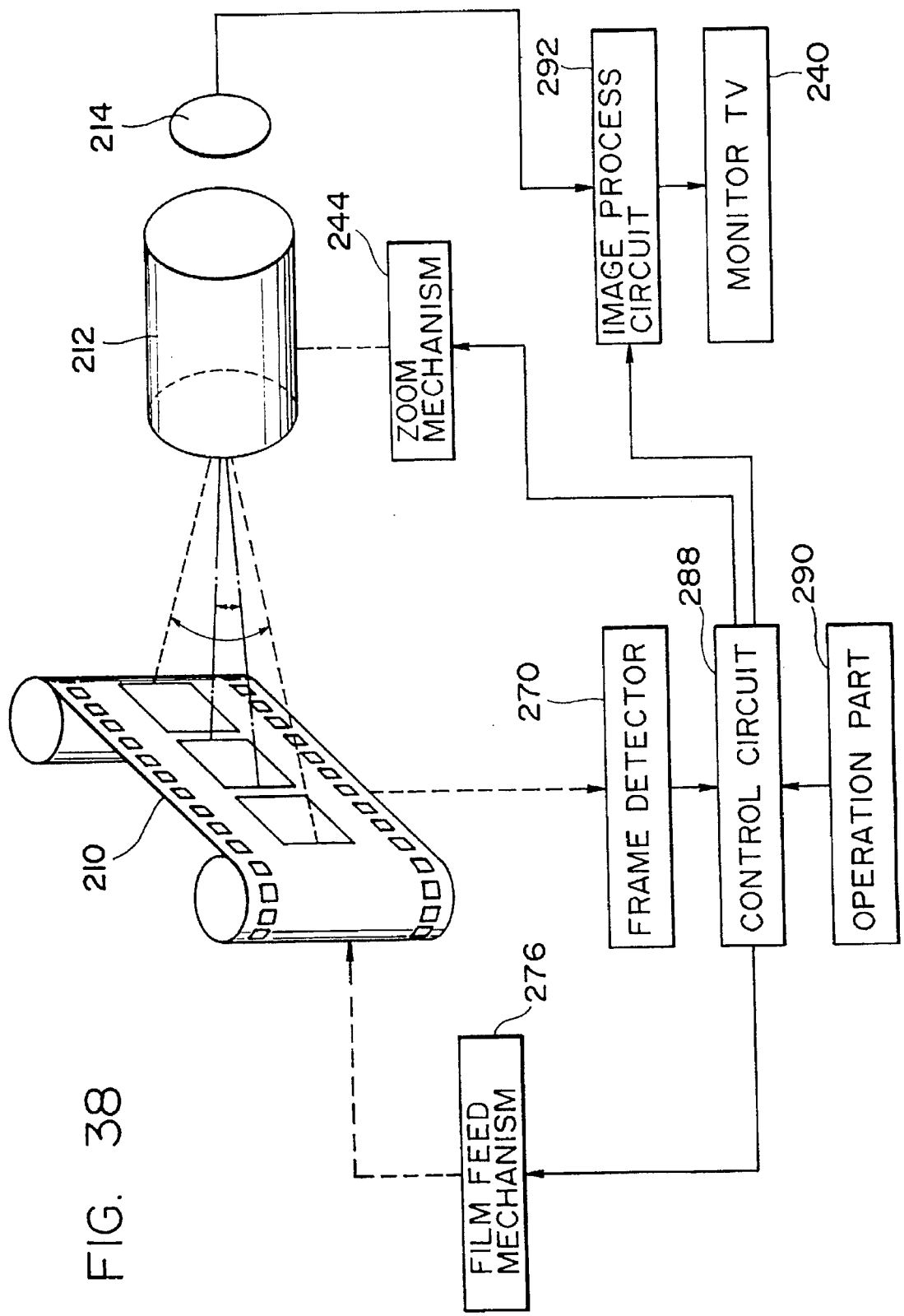
FIG. 38 is a block diagram of a tenth embodiment of a film image input system according to the invention.

Referring now to FIG. 38, there is shown a block diagram of a tenth embodiment of a film image input system according to the present invention, in which parts used in common with the ninth embodiment are given the same designations.

As shown in FIG. 38, the present film image input system mainly consists of an image pickup device including a taking lens 212 and a CCD 214, a frame detector 270, a film feed mechanism 276, a control circuit 288, an operation part 290, a zoom mechanism 244, and an image process circuit 292.

Figure 40:
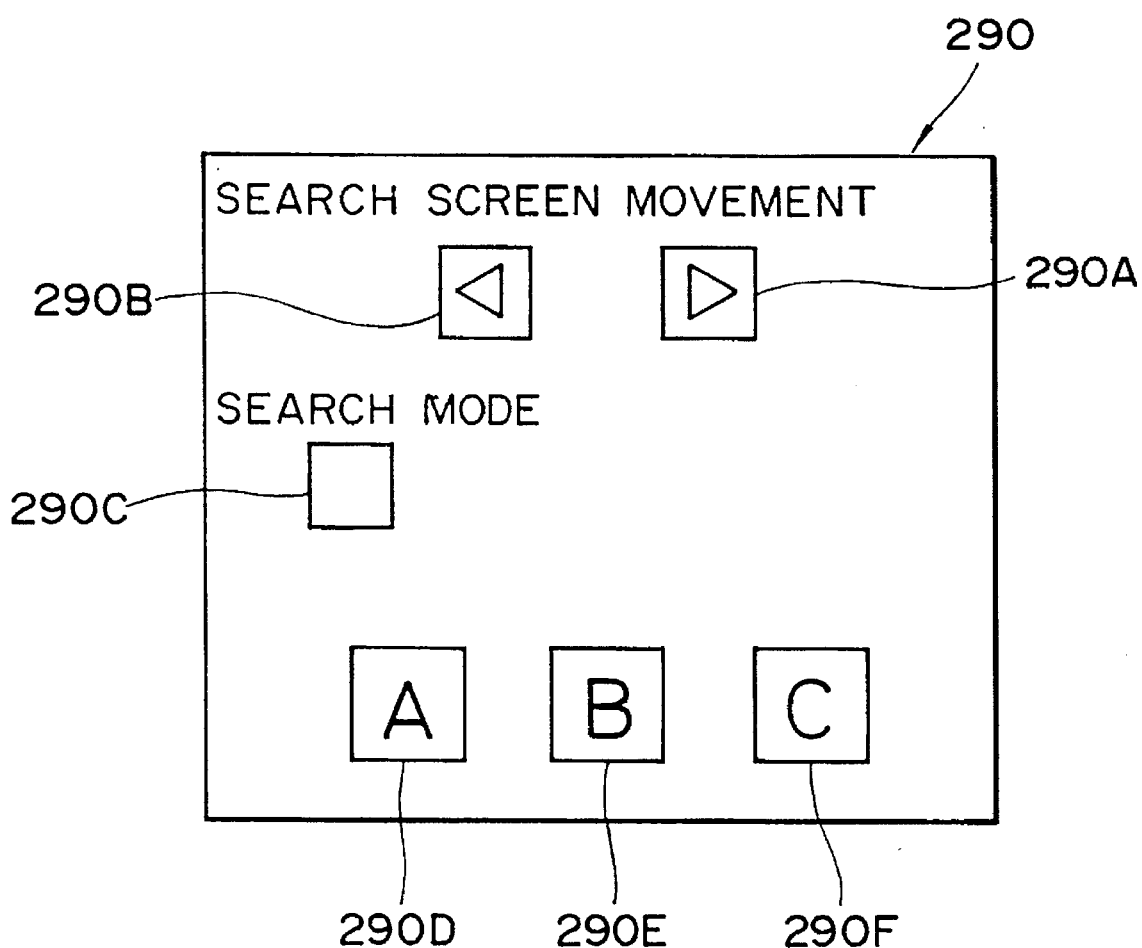
FIG. 40 is a view of details of an operation part of the film image input system shown in FIG. 39.

The operation part 290, as shown in FIG. 40, includes a search screen moving buttons 290A and 290B, a search mode button 290C, and select buttons 290D, 290E, 290F. The operation part 290 outputs to the control circuits 288 signals which correspond to the operations of these buttons.

Responsive to the various signals applied thereto from the operation part 290, the control circuit 288 controls the film feed mechanism 276, zoom mechanism 244 and image process circuit 292, as will be discussed later.

Figure 39:
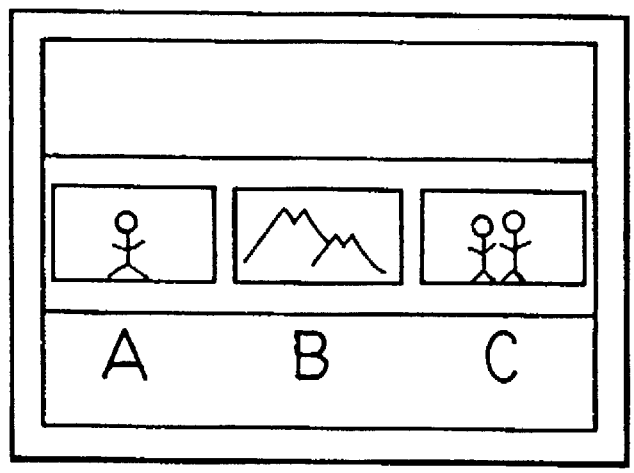
FIG. 39 is a view of an example of a multi-screen to be displayed by a monitor TV employed in the film image input system shown in FIG. 38.

Now, if in the operation part 290 the search mode button 290C is pushed once, then the control circuit 288 outputs a zoom signal to the zoom mechanism 244 to thereby zoom the taking lens 212 so that the taking lens 212 can provide an angle of field which allows the film images of three frames to be picked up simultaneously. As a result of this, the film images of three frames are displayed on the monitor TV 240, as shown in FIG. 39. At the same time, the control circuit 288 also outputs an enable signal to the image process circuit 292 to thereby enable the image process circuit 292, with the result that the image process circuit 292 executes a mask processing and other processings in order that other images than the film images of three frames cannot be displayed on the monitor TV 240.

Here, if the frame to be observed is absent in the display screen, then the search screen moving button 290A or 290B is pushed once. If the search screen moving button 290A or 290B is pushed once, the control circuit 288 outputs a frame feed signal to the film feed mechanism 276 to thereby move the film 210 by three frames in a forward direction or in a reverse direction by means of the film feed mechanism 276.

On the other hand, if the frame to be observed is present in the display screen, then one of the select buttons 290D, 290E, and 290F is pushed once which corresponds to the frame. If one of the select buttons 290D, 290E and 290F is pushed once, then the control circuit 288 outputs a zoom signal to the zoom mechanism 244 to zoom the taking lens 212 so that the taking lens 212 provides an angle of field to allow the film image of one frame to be displayed on the entire screen. At the same time, the control circuit 288 also outputs a disable signal to the image process circuit 292 to disable the image process circuit 292, thereby prohibiting the mask processing by the image process circuit 292.

Further, if the select button 290D or 290F is pushed once, then the control circuit 288 outputs a frame feed signal to the film feed mechanism 276 to thereby move the film 210 by one frame in a forward direction or in a reverse direction by means of the film feed mechanism 276. This makes it possible to select quickly the frame to be displayed on the entire screen.

[Eleventh Embodiment]

Figure 41:
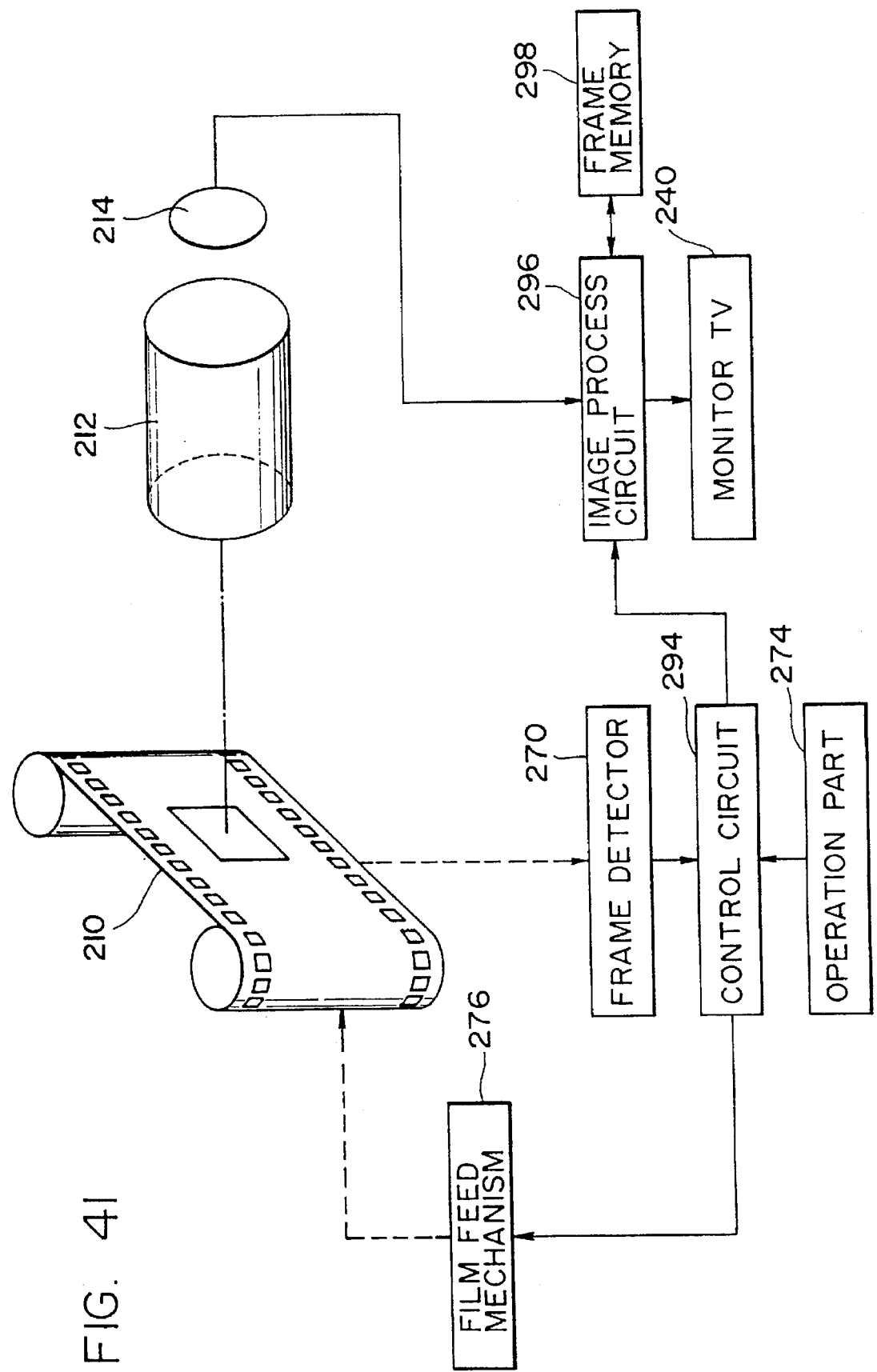
FIG. 41 is a block diagram of a eleventh embodiment of a film image input system according to the invention; and, FIG. 42 is a schematic view of an example of a film image input system according to the prior art.
Figure 42:
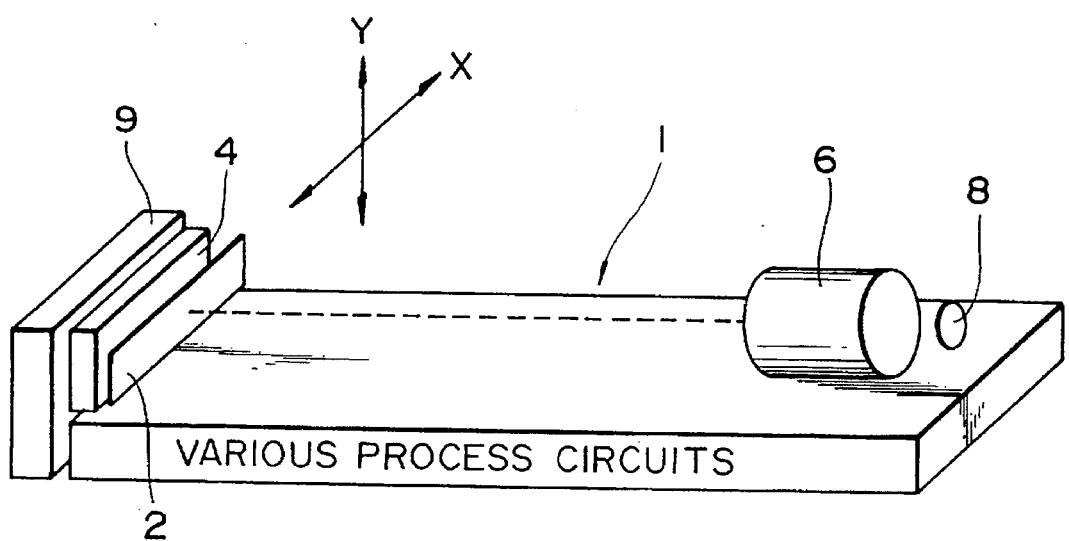

Referring now to FIG. 41, there is shown a block diagram of an eleventh embodiment of a film image input system according to the present invention, in which parts used in common with the ninth embodiment are given the same designations.

As shown in FIG. 41, the present film image input system mainly consists of an image pickup device including a taking lens 212 and a CCD 214, a frame detector 276, an operation part 274, a film feed mechanism 276, a control circuit 294, an image process circuit 296, and a frame memory 298.

When comparing the ninth and eleventh embodiments with each other, the eleventh embodiment is different from the ninth embodiment mainly in that the frame memory 298 has storage portions corresponding a plurality of frames. That is, if in the operation part 274 the multi-screen forming button 274C is pushed once and thus a multi-screen forming mode is set, then the control circuit 294 controls the film feed mechanism 276 to frame feed the film 210 by a given number of frames (for example, by four frames) sequentially and also controls the image process circuit 296 to allow the frame memory 298 to store the image signals of these frames sequentially.

When the image signals of the given number of frames are stored in the frame memory 298 in the above-mentioned manner, then the image process circuit 296 reads out the image signals of all frames from the frame memory 298, compresses these image signals respectively to thereby generate an image signal corresponding to a multi-screen consisting of a given number of frames, and outputs the image signal to the monitor TV 240. As a result of this, the multi-screen consisting of a given number of frames can be displayed on the monitor TV 240.

And, if one frame is selected from the multi-screen by the operation part 274, then the image process circuit 296 reads out an image signal of the selected frame from the frame memory 298, and outputs the image signal to the monitor TV 240. As a result of this, only the selected frame can be displayed on the entire screen of the monitor TV 240.

As has been described heretofore, according to the film image input system of the invention, due to the fact that the optical axis of the takings lens is bent by use of the mirror, the whole system can be made compact, it is possible to supply a taking lens of a variable image magnification by use of an inexpensive single focus lens, and there is eliminated the need to move the image pickup element independently to thereby avoid inconveniences provided when the image pickup element is moved.

Also, according to the present invention, due to the fact that the film image is scanned by adjusting the angle of inclination of the mirror, the scan mechanism can be made compact and also, due to the fact that the optical axis of the taking lens is bent by the mirror, the whole system can be made compact and the freedom of design of the whole system can be expanded. Further, due to the fact that the mirror and the film or two mirrors are rotated at a given relationship therebetween to thereby allow the optical axis of the taking lens to always intersect the surface of the film at a right angle irrespective of the scan positions, focusing can be achieved over the whole image even if the image magnification is great and the depth of field is shallow.

Moreover, according to the present invention, due to the fact that, when performing a trimming operation, a screen to display a combined picture of an image of the whole of one frame and a trimming frame and a screen to display the image being currently picked up within the trimming frame are displayed in combination within one screen, a desired trimming operation can be executed while observing the trimming frame. Also, the image being trimmed and the image of the whole of one frame can be confirmed at the same time and further it is possible to display only the trimming image after the trimming operation is completed. In addition, due to the fact that a plurality of frames can be displayed simultaneously on the monitor TV and a desired frame can be selected while observing the display screen of the monitor TV, it is possible to search a film having a large number of frames for the desired frame easily and quickly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A film image input system which forms an image of a developed still photo film on a light receiving surface of an image pickup element through a zoomable taking lens and outputs to a monitor TV an image signal photo-electrically converted by the image pickup element to thereby reproduce the film image on the screen of the monitor TV, said film image input system comprising:

film feed means for winding or rewinding said film frame by frame;

instruction means for instructing forming of a multi-screen;

an image memory for storing an image of one picture by use of n pieces of memory portions;

image process means, if said multi-screen forming is instructed by said instruction means, enabled to compress image signals of n pieces of frames output from said image pickup element to store said compressed image signals in the n pieces of memory portions of said image memory;

screen switching means for outputting to said monitor TV one of said image signal from said image pickup element and said image signal stored in said image memory;

select means, in accordance with said image signal stored in said image memory, for selecting one small screen of n pieces of small screens forming said multi-screen displayed on said monitor TV; and, control means, if said multi-screen forming is instructed by said instruction means, for controlling said film feed means in order to photograph n pieces of frames and controlling said screen switching means so that said image signal from said image memory can be output to said monitor TV and, if a small screen is selected by said select means, for controlling said film feed means in order to photograph said selected small screen and controlling said screen switching means so that said image signal from said image pickup element can be output to said monitor TV.

2. A film image input system which forms an image of a developed still photo film on a light receiving surface of an image pickup element through a zoomable taking lens and outputs to a monitor TV an image signal photo-electrically converted by the image pickup element to thereby reproduce the film image on the screen of the monitor TV, said film image input system comprising:

a zoom mechanism for varying the image magnification of said taking lens;

film feed means for winding or rewinding said film frame by frame;

instruction means for generating an instruction signal for instructing simultaneous photographing of a plurality of frames;

select means for generating a select signal for selecting one frame out of said plurality of frames; and control means for controlling said zoom mechanism, when said instruction signal is generated, so that said taking lens photographs the plurality of frames instructed by said instruction signal, and for controlling, when said select signal is generated, said zoom mechanism and said film feed means, in accordance with said select signal, so that only said selected frame is photographed.

3. A film image input system which forms an image of a developed still photo film on a light receiving surface of an image pickup element through a zoomable taking lens and outputs to a monitor TV an image signal photo-electrically converted by the image pickup element to thereby reproduce the film image on the screen of the monitor TV, said film image input system comprising:

instruction means for instructing forming of a multi-screen consisting of n pieces of small screens to be displayed on said monitor TV;

select means for selecting one small screen out of said multi-screen;

film feed means for winding or rewinding said film frame by frame if the forming of a multi-screen is instructed by said instruction means;

image memory for storing the image signals of n pieces of frames sequentially applied from said image pickup element with the film feeding by said film feed means; and, image process means, if the multi-screen forming is instructed by said instruction means, for reading out the images signals of n pieces of frames from said image memory, compressing said image signals respectively to generate an image signal corresponding to said multi-screen and outputting said image signal to said monitor TV and, if a small screen is selected by said select means, for reading out from said image memory an image signal corresponding to said selected small screen and outputting said read-out image signal to said monitor TV.

* * * * *